(12) United States Patent
Yanase

(10) Patent No.: US 7,136,775 B2
(45) Date of Patent: Nov. 14, 2006

(54) METHOD AND DEVICE FOR DETECTING DECOMPRESSION OF TIRES, AND PROGRAM FOR JUDGING DECOMPRESSION OF TIRES

(75) Inventor: Minao Yanase, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/968,157

(22) Filed: Oct. 20, 2004

(65) Prior Publication Data
US 2005/0087008 A1    Apr. 28, 2005

(30) Foreign Application Priority Data

| Oct. 27, 2003 | (JP) | ............................. 2003-366397 |
| Oct. 27, 2003 | (JP) | ............................. 2003-366398 |
| Nov. 20, 2003 | (JP) | ............................. 2003-390687 |

(51) Int. Cl.
*G01L 7/00* (2006.01)

(52) U.S. Cl. ...................... 702/140; 702/138; 702/50; 702/98

(58) Field of Classification Search ................. 702/140
See application file for complete search history.

(56) References Cited

U.S. PATENT DOCUMENTS

| 4,876,528 A | 10/1989 | Walker et al. |
| 5,721,528 A * | 2/1998 | Boesch et al. ............... 340/442 |
| 6,061,642 A | 5/2000 | Nakajima |
| 6,529,807 B1 * | 3/2003 | Sugisawa ...................... 701/29 |
| 6,529,851 B1 * | 3/2003 | Oshiro ........................ 702/148 |

FOREIGN PATENT DOCUMENTS

| JP | 63-305011 A | 12/1988 |
| JP | 9-249010 A | 9/1997 |
| JP | 11-123911 A | 5/1999 |
| JP | 2000-79812 A | 3/2000 |
| JP | 2002-211220 A | 7/2002 |
| JP | 2002-362121 A | 12/2002 |

* cited by examiner

*Primary Examiner*—Michael Nghiem
*Assistant Examiner*—Stephen J. Cherry
(74) *Attorney, Agent, or Firm*—Birch, Stewart, Kolasch & Birch, LLP

(57) ABSTRACT

A detection method of reduced air pressure of tires based on the rotational speed of wheels mounted on a vehicle. The method includes steps of: determining the rotational speed of each wheel, memorizing the rotational speed of each wheel, determining the loading sensitivity of the dynamic load radius of tires caused by movement of a load during turning, comparing the loading sensitivity with the loading sensitivity of the dynamic load radii of tires at initialization which are preliminarily memorized, and judging decompression of tires based on the result of the comparison. Further, a loading sensitivity-calculating method of determining the loading sensitivity of the dynamic load radii of tires includes steps of: determining a lateral acceleration during turning of a vehicle, determining the shift rate of a judgment value which is the relative comparison of rotational speed of wheels on a pair of diagonals of a vehicle, and determining the loading sensitivity.

24 Claims, 10 Drawing Sheets

METHOD AND DEVICE FOR DETECTING DECOMPRESSION OF TIRES, AND PROGRAM FOR JUDGING DECOMPRESSION OF TIRES

This Nonprovisional application claims priority under 35 U.S.C. § 119(a) on Patent Application No(s). 2003-366397; 2003-366398; and 2003-390687 filed in Japan on Oct. 27, 2003; Oct. 27, 2003; and Nov. 20, 2003, respectively, the entire contents of which are hereby incorporated by reference.

TECHNICAL FIELD

The present invention relates to a method and a device for detecting decompression of tires, and a program for judging decompression of tires. More specifically, the present invention relates to a detection method of reducing the air pressure of tires which can broaden a region judging as to whether the air pressure of tires is reduced and improve the accuracy of reduced pressure judgment and a device thereof, and a judgment program of the reduced pressures of tires.

BACKGROUND OF THE INVENTION

A conventional detection device for reducing of the air pressure of tires uses a principle that since the outer diameter of a tire (the dynamic load radius of a tire) is reduced more than that of a tire having a normal inner pressure when the pressure of a tire is reduced, a rotational angular velocity is increased as compared with other normal tires. For example, a method of detecting the lowering of an inner pressure from the relative difference of the rotational angular velocity of a tire uses as a judgment value;

$$DEL=\{(F1+F4)/2-(F2+F3)/2\}/\{(F1+F2+F3+F4)/4\}\times 100(\%)$$

(Refer to Japanese Unexamined Patent Publication No.305011/1988).

Where F1 to F4 are the rotational angular velocities of a front left tire, a front right tire, a rear left tire and a rear right tire, respectively.

When DEL value exceeds a preliminarily set alarm threshold by calculating the DEL value, further carrying out requisite corrections such as cornering correction, and deleting data unsuitable for judgment, it is judged that the reduced pressure of a tire is generated, and an alarm is informed to a driver. However, even if the reduced pressure is the same 30%, the size of the above-mentioned DEL value differs depending on the kind of a tire and the like. Accordingly, the reduced pressure sensitivity being the change rate of a dynamic load radius caused by reduced pressure which a respective tire has is respectively measured for preliminarily set tires (tires for summer and tires for winter) in order to determine the above-mentioned threshold. By setting the threshold at intermediary reduced pressure sensitivity, it is designed not to generate a great difference in detection sensitivity, even if the tires were also replaced. For example, when tires having 2-fold difference in the reduced pressure sensitivity are mounted on the same vehicle, an alarm threshold is set so that a high sensitive tire alarms at a reduced pressure of 20% and a low sensitive tire alarms at a reduced pressure of 40%.

Since a conventional device detects the reduced pressure of a tire utilizing so-called reduced pressure sensitivity that the dynamic load radius of a tire is lessened by reduced pressure, the judgment of the reduced pressure is carried out by difference between one of the sum of rotational angular velocities and the other of the sum of the rotational angular velocities which are situated at the diagonal of four wheels. Therefore, the simultaneous reduced pressures of two front wheels, the simultaneous reduced pressures of two rear wheels, and the simultaneous reduced pressures of whole wheels cannot be detected. Accordingly, there are problems that driving a car without knowing the reduced pressures causes the deterioration of fuel cost caused by the increase of rolling resistance of tires, and further causes burst.

Further, since alarm at a reduced pressure of 30% is an essential requisite by Law Regulation in the North America, there is a problem that the approved range of the reduced pressure level for alarming must be lessened so as to alarm between a reduced pressure of 15% and a reduced pressure of 30%. Further, there is a problem that a case unable to be corresponded with a lesser approved range is generated when set tires for one grade of a car have a wide range. The information of the reduced pressure sensitivities of tires mounted is required for solving these problems, but it is ambiguous in reality what type of tires a user mounts, therefore the reduced pressure sensitivities of tires currently mounted cannot be known.

SUMMARY OF THE INVENTION

Under these circumstances, the object of the present invention is to provide a detection method of reducing the air pressure of tires which can broaden a region judging reducing the air pressure of tires and improve the accuracy of reduced pressure judgment, by detecting the simultaneous reduced pressure of whole wheels and a device thereof, and a judgment program of the reduced pressures of tires.

The detection method of reducing the air pressure of tires of the present invention is characterized in a detection method of reducing the air pressure of tires based on the rotational speed of wheels mounted on a vehicle, comprising steps of: determining the rotational speed of the above-mentioned each wheel, memorizing the rotational speed of the wheels, determining the loading sensitivity of the dynamic load radius of tires caused by movement of a load during turning of the above-mentioned vehicle, comparing the loading sensitivity of the dynamic load radii of tires caused by movement of a load during the turning with the predetermined loading sensitivity of the dynamic load radii of tires when the air pressures of tires are normal, and judging decompression of tires based on the result of the comparison.

Further, the detection method of reducing the air pressure of tires of the present invention is characterized in a detection method of reducing the air pressure of tires based on the rotational speed of wheels mounted on a vehicle, comprising steps of: determining the rotational speed of the above-mentioned each wheel, memorizing the rotational speed of the wheel, determining a relation equation between lateral acceleration of the vehicle and a judgment value which is a relative comparison of wheel rotational speed on a pair of diagonals, comparing the relation equation with the predetermined relation equation between a judgment value and lateral acceleration of the vehicle when the air pressures of tires are normal, and judging decompression of tires based on the result of the comparison.

Further, the detection device of reducing the air pressure of tires of the present invention is characterized in a detection device of reducing the air pressure of tires which detects reducing the air pressure of tires based on the rotational speed of wheels mounted on a vehicle, equipped with a rotational speed-detecting means of determining the rotational speed of the above-mentioned each wheel, a memory means of memorizing the rotational speed of the wheel, a sensitivity-calculating means of determining the loading sensitivity of the dynamic load radii of tires caused by movement of a load during turning of the above-mentioned vehicle, a sensitivity-comparing means of comparing the loading sensitivity of the dynamic load radii of tires caused by movement of a load during the turning with the predetermined loading sensitivity of the dynamic load radii of tires when the air pressures of tires are normal, and a judgment means of judging reducing the air pressure of tires based on the result of the comparison.

Further, the detection device of reducing the air pressure of tires of the present invention is characterized in a detection device of reducing the air pressure of tires which detects reducing the air pressure of tires based on the rotational speed of wheels mounted on a vehicle, equipped with a rotational speed-detecting means of determining the rotational speed of the above-mentioned each wheel, a memory means of memorizing the rotational speed of the wheel, a relation equation-calculating means of determining a relation equation between lateral acceleration of the vehicle and a judgment value which is a relative comparison of wheel rotational speed on a pair of diagonals, a comparison means of comparing the relation equation with the predetermined relation equation between a judgment value and lateral acceleration of the vehicle when the air pressures of tires are normal, and a judgment means of judging reducing the air pressure of tires based on the result of the comparison.

Further, the judgment program of the reduced pressures of tires of the present invention is characterized in a judgment program of the reduced pressures of tires for functionalizing a computer as a memory means of memorizing the rotational speed of the wheel, a sensitivity-calculating means of determining the loading sensitivity of the dynamic load radii of tires caused by movement of a load during turning of the above-mentioned vehicle, a sensitivity-comparing means of comparing the loading sensitivity of the dynamic load radii of tires caused by movement of a load during the turning with the predetermined loading sensitivity of the dynamic load radii of tires when the air pressures of tires are normal, and a judgment means of judging reducing the air pressure of tires based on the result of the comparison, in order to judge reducing the air pressure of tires based on the rotational speed of wheels mounted on a vehicle.

Further, the judgment program of the reduced pressures of tires of the present invention is characterized in a judgment program of the reduced pressures of tires for functionalizing a computer as a memory means of memorizing the rotational speed of the wheel, a relation equation-calculating means of determining a relation equation between lateral acceleration of a vehicle and a judgment value which is a relative comparison of wheel rotational speeds on a pair of diagonals, a comparison means of comparing the relation equation with the predetermined relation equation between a judgment value and lateral acceleration of the vehicle when the air pressures of tires are normal, and a judgment means of judging of reducing the air pressure of tires based on the result of the comparison, in order to judge reducing the air pressure of tires based on the rotational speed of wheels mounted on a vehicle.

The detection method of reducing the air pressure of tires of the present invention is characterized in comprising steps of: determining the rotational speed of the above-mentioned each wheel, memorizing the rotational speed of the wheel, determining the loading sensitivity of the dynamic load radii of tires caused by movement of a load during turning of the above-mentioned vehicle, comparing the loading sensitivity of the dynamic load radii of tires caused by movement of a load during the turning with the predetermined loading sensitivity of the dynamic load radii of various tires which are preliminarily memorized, deducing the reduced pressure sensitivity of the dynamic load radii of the above-mentioned tires based on the result of the comparison, and judging decompression of tires based on the result of the deduction.

Further, the detection method of reducing the air pressure of tires of the present invention is characterized in comprising steps of: determining the rotational speed of the above-mentioned each wheel, memorizing the rotational speed of the wheel, determining a relation equation between the lataral acceleration of the above-mentioned vehicle and a judgment value which is a relative comparison of wheel rotational speeds on a pair of diagonals, comparing the relation equation with the predetermined relation equation between a judgment value and the lateral accelerations of various tires which are preliminarily memorized, deducing the reduced pressure sensitivity of the dynamic load radii of the above-mentioned tires based on the result of the comparison, and judging decompression of tires based on the result of the deduction.

Furthermore, the detection device of reducing the air pressure of tires of the present invention is characterized by being equipped with a rotational speed-detecting means of determining the rotational speed of the above-mentioned each wheel, a memory means of memorizing the rotational speed of the wheel, a sensitivity-calculating means of determining the loading sensitivity of the dynamic load radii of tires caused by movement of a load during turning of the above-mentioned vehicle, a sensitivity-comparing means of comparing the loading sensitivity of the dynamic load radii of tires caused by movement of a load during the turning with the loading sensitivity of the dynamic load radii of various tires which are preliminarily memorized, a sensitivity-deducing means of deducing the reduced pressure sensitivity of the dynamic load radii of the above-mentioned tires based on the result of the comparison, and a judgment means of judging reducing the air pressure of tires based on the result of the deduction.

Further, the detection device of reducing the air pressure of tires of the present invention is characterized by being equipped with a rotational speed-detecting means of determining the rotational speed of the above-mentioned each wheel, a memory means of memorizing the rotational speed of the wheel, a relation equation-calculating means of determining a relation equation between the lateral acceleration of the above-mentioned vehicle and a judgment value which is a relative comparison of wheel rotational speed on a pair of diagonals, a comparison means of comparing the relation equation with the predetermined relation equation between a judgment value and the lateral accelerations of various tires which are preliminarily memorized, a sensitivity-deducing means of deducing the reduced pressure sensitivity of the dynamic load radii of the above-mentioned tires based on the result of the comparison, and a judgment means of judging reducing the air pressure of tires based on the result of the deduction.

Furthermore, the judgment program of the reduced pressures of tires of the present invention is characterized by functionalizing a computer as a memory means of memorizing the rotational speed of the wheel, a sensitivity-calculating means of determining the loading sensitivity of the dynamic load radii of tires caused by movement of a load during turning, a sensitivity-comparing means of comparing the loading sensitivity of the dynamic load radii of tires caused by movement of a load during the turning with the predetermined loading sensitivity of the dynamic load radii of various tires which are preliminarily memorized, a sensitivity-deducing means of deducing the reduced pressure sensitivity of the dynamic load radii of the above-mentioned tires based on the result of the comparison, and a judgment means of judging reducing the air pressure of tires based on the result of the deduction, in order to judge reducing the air pressure of tires based on the rotational speeds of wheels which are obtained by tires mounted on a vehicle.

Further, the judgment program of the reduced pressures of tires of the present invention is characterized by functionalizing a computer as a memory means of memorizing the rotational speed of the above-mentioned wheel, a relation equation-calculating means of determining a relation equation between lateral acceleration of a vehicle and a judgment value which is a relative comparison of wheel rotational speeds on a pair of diagonals, a comparison means of comparing the relation equation with the predetermined relation equation between a judgment value and the lateral accelerations of various tires which are preliminarily memorized, a sensitivity-deducing means of deducing the reduced pressure sensitivity of the dynamic load radii of the above-mentioned tires based on the result of the comparison, and a judgment means of judging reducing the air pressure of tires based on the result of the deduction, in order to judge reducing the air pressure of tires based on the rotational speeds of wheels which are obtained from tires mounted on a vehicle.

Furthermore, the loading sensitivity-calculating method of determining the loading sensitivity of the dynamic load radii of tires of the present invention is characterized by comprising steps of: determining lateral acceleration during turning of a vehicle, determining the shift rate of a judgment value which is the relative comparison of rotational speeds of wheels on a pair of diagonals of a vehicle during turning of the vehicle, and determining the loading sensitivity which is a value obtained by dividing the above-mentioned shift rate by an lateral acceleration by every vehicle speed region.

Further, the loading sensitivity-calculating method of determining the loading sensitivity of the dynamic load radii of tires of the present invention is characterized in comprising steps of: determining the yaw rate of a vehicle, determining lateral acceleration during turning of the above-mentioned vehicle, determining the reciprocal of a turning radius obtained from the wheel rotational speed of the above-mentioned vehicle and the reciprocal of a turning radius obtained from the above-mentioned yaw rate, and determining the loading sensitivity which is a value obtained by dividing a difference between the reciprocal of a turning radius obtained from the above-mentioned wheel rotational speed by every vehicle speed region and the reciprocal of a turning radius obtained from the above-mentioned yaw rate, by the above-mentioned lateral acceleration.

Furthermore, the loading sensitivity-calculating method of determining the loading sensitivity of the dynamic load radii of tires of the present invention is characterized by comprising steps of: determining lateral acceleration during turning of a vehicle, determining the reciprocal of a turning radius obtained from the wheel rotational speed of the vehicle and the reciprocal of a turning radius obtained from the lateral acceleration, and determining the loading sensitivity which is a value obtained by dividing a difference between the reciprocal of a turning radius obtained from the above-mentioned wheel rotational speed by every vehicle speed region and the reciprocal of a turning radius obtained from the lateral acceleration, by the lateral acceleration.

The air pressure of tire is reduced slowly without failure of the tire. Besides decompression of tire by growth of size of new tire or low temperature, the air pressure of tire is reduced by filtering air through rubber of tire. In those cases the air pressure of whole tires mounted on a vehicle are simultaneously reduced, and the decompression can not be found by the driver. According to the present invention, the reduced pressures of the whole tires can be detected. It can be informed that the whole tires are decompressed, and it save the mileage of the vehicle and can avoid danger of burst of the tires in high speed driving. Referring to Example 2 described later, in the case of a FF car (tire dimension: Tire 185/70R14) of 1800 cc, a slope of the judgment value DEL during turning against the lateral acceleration at normal air pressure is 0.3125, and on the other hand, a slope at reduced pressures for the whole wheels was 0.1434 and small. Thus, it was grasped that the reduced pressures for the whole wheels could be detected from the slope of the judgment value, DEL during turning against the lateral acceleration.

Further, a type of tire may be changed to adapt the running performance of the vehicle to the environment and to the condition of the road surface. For example, a vehicle is mounted with tires for high speed running and reduced noise on dry asphalt road, and is mounted with studless winter tires on snowy road. Since the reduced pressure sensitivities of tires changes according to the type of tires, the decompression of various tires cannot be judged by a single threshold value of decompression judgment. Since the reduced pressure sensitivities of tires can be deduced according to the present invention, the coefficient of reduced pressure for alarming can be appropriately set by changing a threshold in accordance with the reduced pressure sensitivities, and the accuracy of the reduced pressure judgment can be improved. Therefore, it can be informed accurately that the tire is decompressed even if tires are changed in a vehicle having many setting tire sizes. Referring to Example 4 described later, in the case of a FF car of 1800 cc, the threshold of alarm is set at 0.18 where the slope of lowly sensitive tires (tire dimension: Tire 205/65R15) was 0.118, and the threshold of alarm is set at 0.30 where the slope of highly sensitive tires (tire dimension: Tire 205/60R16) is 0.170. Thus, an alarm can be accurately issued at a same reduced pressure (30%) for various type of tires.

DESCRIPTION OF PREFERED EMBODIMENT

The detection method of reducing the air pressure of tires of the present invention and a device thereof, and a judgment program of the reduced pressures of tires are illustrated below based on the attached drawings.

Figure 1:
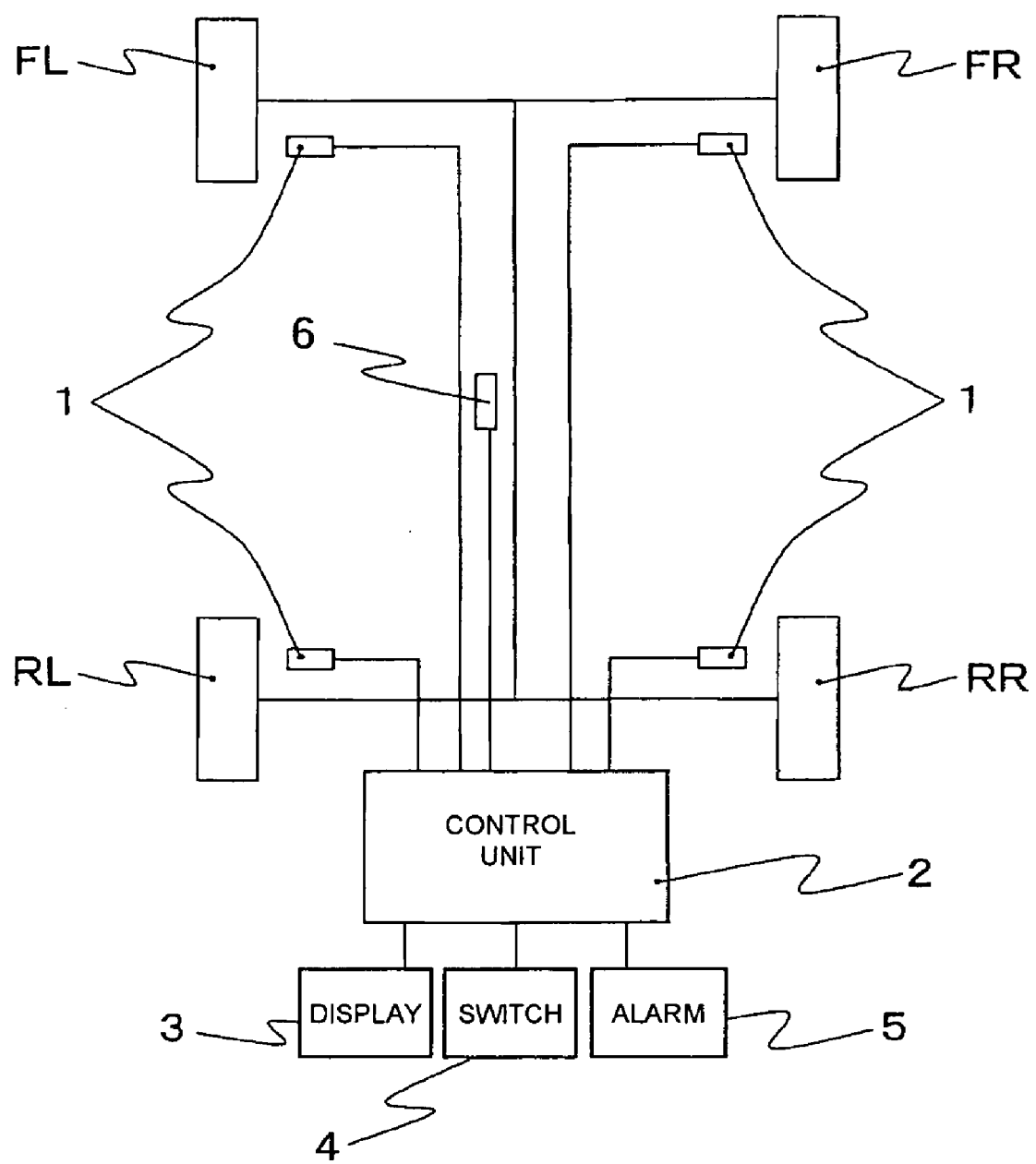
FIG. 1 is a block diagram showing the detection device of reducing the air pressure of tires related to one embodiment of the present invention.

As shown in FIG. 1, the detection device of reducing the air pressure of tires related to one embodiment of the present invention detects whether the air pressures of four tires, FL, FR, RL and RR which were provided on a vehicle are lowered or not, and is equipped with usual revolution speed-detecting means 1 which were respectively provided with tires.

As the above-mentioned rotational speed-detecting means 1, a wheel speed sensor for generating rotary pulses using an electromagnetic pickup and the like and measuring wheel speed information such as a rotational angular velocity and a wheel speed from the number of pulses, or an angular velocity sensor including those which generate power utilizing rotation such as a dynamo and measure a rotational angular velocity and a wheel speed from the voltage, or the like can be used. The output of the above-mentioned rotational speed-detecting means 1 is provided to the control unit 2 which is a computer such as ABS. A display 3 which is constituted by a liquid crystal display, a plasma display device or a CRT for informing a tire whose air pressure was reduced, an initialization switch 4 which can be operated by a driver, and an alarming device 5 are connected with the control unit 2. Further, a yaw rate-detecting means 6 outputting signals in accordance with the yaw rate of a vehicle is provided on the vehicle. The output of the yaw rate-detecting means 6 is provided to the control unit 2.

Figure 2:
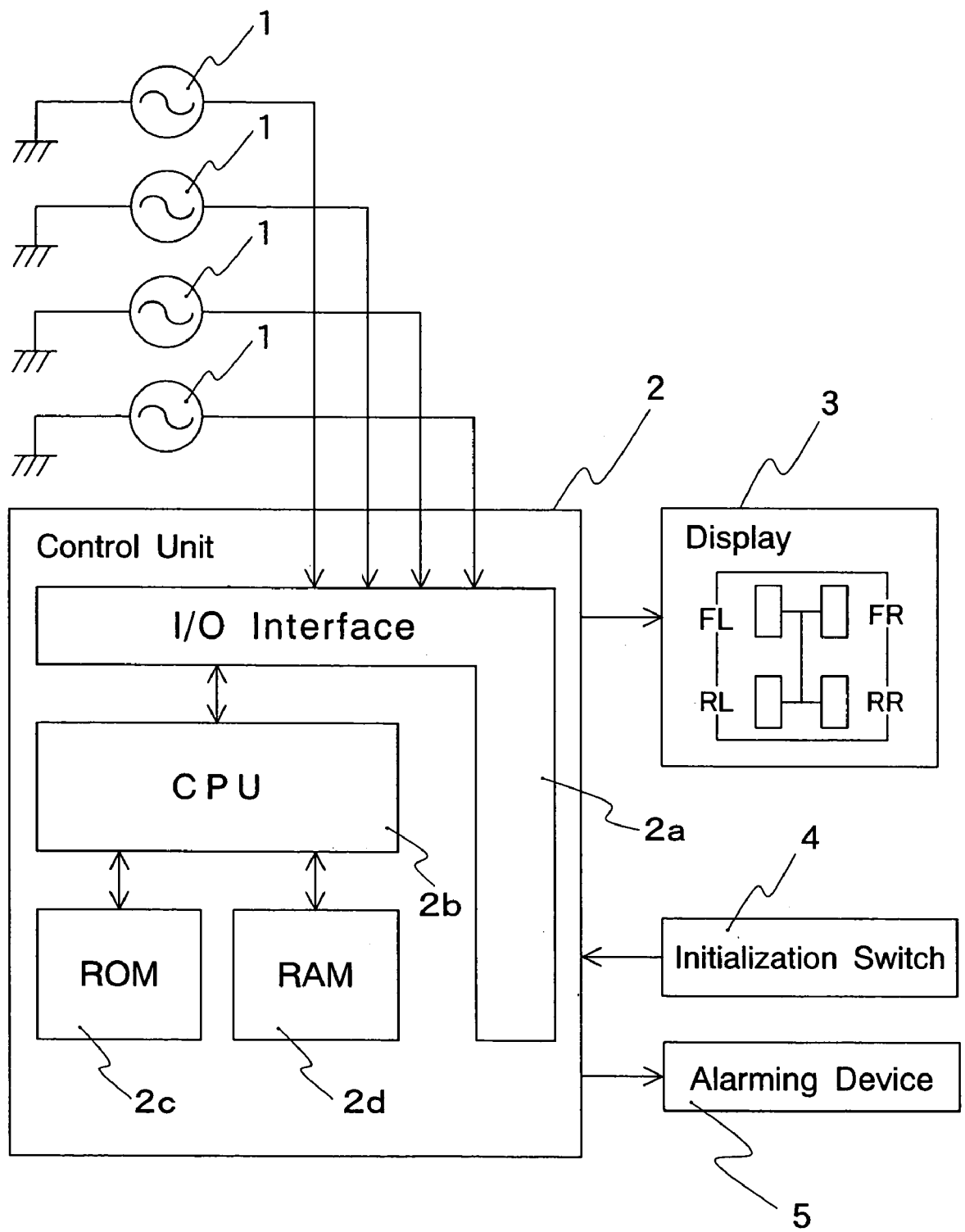
FIG. 2 is a block diagram showing the electric constitution of the detection device of reducing the air pressure of tires of FIG. 1.

The above-mentioned control unit 2 is constituted by an I/O interface 2a which is necessary for transferring signals with external devices, a CPU 2b functioning as the center of processing, a ROM 2c in which the control operation program of said CPU 2b was stored, and a RAM 2d in which data are temporarily downloaded and the downloaded data and the like are read out when the above-mentioned CPU 2b carries out control operation, as shown in FIG. 2.

The above-mentioned rotational speed-detecting means 1 outputs pulse signals (hereinafter, referred to as wheel speed pulses) corresponding to the rotation numbers of tires. Further, CPU 2b calculates the rotational angular velocities, Fi, of the respective tires by every fixed sampling cycle, $\Delta T$ (sec), for example, by every $\Delta T=1$ second, based on the wheel speed pulses which were output from the rotational speed-detecting means 1.

By the way, since tires are produced including unevenness (initial difference) within specification, the effective rolling radii (a value obtained by dividing a distance proceeded by one rotation, by $2\pi$) of respective tires are not always the same even if all tires have normal air pressure. Accordingly, the rotational angular velocities, Fi of respective tires come to be uneven. Therefore, for example, there is a method of excluding the influence of initial difference from the revolutionary angular velocities, Fi. Firstly, the method calculates initial correction coefficients K1, K2 and K3 which are shown as follow.

$$K1=F1/F2 \qquad (1)$$

$$K2=F3/F4 \qquad (2)$$

$$K3=(F1+K1\times F2)/(F2+K2\times F4) \qquad (3)$$

Subsequently, new the rotational angular velocities, $F1_i$ are determined using the initial correction coefficients K1, K2 and K3 which were thus calculated, as shown in the equations (4) to (7).

$$F1_1=F1 \qquad (4)$$

$$F1_2=K1\times F2 \qquad (5)$$

$$F1_3=K3\times F3 \qquad (6)$$

$$F1_4=K2\times F3\times F4 \qquad (7)$$

Herein, the initial correction coefficient, K1, is a coefficient for correcting the difference of effective rolling radius which is caused by the initial difference between left and right front tires. The initial correction coefficient, K2, is a coefficient for correcting the difference of effective rolling radius caused by the initial difference between left and right rear tires. The initial correction coefficient, K3, is a coefficient for correcting the difference of effective rolling radius caused by the initial difference between a left front tire and a left rear tire.

Then, the wheel speed of a tire of each wheel, Vi, a vehicle speed V, lateral acceleration and the like are calculated based on the above-mentioned $F1_i$. For example, with respect to the above-mentioned lateral acceleration of a vehicle, the speeds, V1 and V2, of following wheel tires, FL and FR are calculated in case of a FR car, and then, a turning radius, R is calculated.

$$R=\{(V2+V1)/(V2-V1)\}\times T_W/2 \qquad (8)$$

Wherein Tw is a distance (tread width) (m) between kingpins.

Then, the lateral acceleration of a vehicle can be calculated by the following equation (9) based on the turning radius, R of a vehicle.

$$\text{Lateral Acceleration}=V^2/R \qquad (9)$$

Further, the lateral acceleration can be also determined with lateral acceleration sensor.

Furthermore, in the present embodiment, a judgment value which is the relative comparison of a wheel speed on a pair of diagonals utilizing the reduced pressure sensitivities of dynamic load radii of tires is used as the judgment value, DEL for detecting the lowering of air pressure, as shown in the equation (10). Namely, the average value of the wheel speeds of a pair of wheels on other diagonals is subtracted from the average value of the wheel speeds of a pair of wheels on diagonals, and the ratio of the result to the average value of two sums is used.

$$DEL=\{(V1+V4)/2-(V2+V3)/2\}/\{(V1+V2+V3+V4)/4\}\times 100(\%) \qquad (10)$$

Where V1 to V4 are the wheel speeds of a left front tire FL, a right front tire FR, a left rear tire RL and a right rear tire RR, respectively.

Since the above-mentioned judgment value, DEL utilizes the reduced pressure sensitivity and the diagonal sum of the wheel speeds on a pair of diagonals is compared, the difference of wheel speeds between outside turning and inside turning is compensated, and no shift of the judgment value, DEL during turning is ought to be found. However, the judgment value, DEL during turning is shifted in reality caused by the influence of load movement during turning and the influence of slipping of drive wheels.

(1) Namely, a load weighing on a tire at outside turning becomes heavier because of load movement caused by the lateral acceleration faced to outside turning, and a load weighing on a tire at inside turning becomes lighter, therefore the dynamic load radii (accordingly, wheel speeds) of tires are changed.

For example, when the increased quantities (retardation quantity) of wheel speeds of the front tires and rear tires caused by the load movement at left turning are referred to as dVf and dVr, the judgment value, DEL of the above-mentioned equation (10) is as follow:

$$DEL'=\{(V1-dVf+V4+dVr)/2-(V2+dVf+V3+dVr)/2\}/\{(V1+V2+V3+V4)/4\}\times 100(\%)=\{(V1+V4)-(V2+V3)-2\times(dVf-dVr)\}/\{(2\times V)\}\times 100(\%) \quad (11)$$

The difference between the above-mentioned equation (10) and the equation (11) is as follow:

$$\Delta DEL=\{(dVf-dVr)/V\}\times 100(\%) \quad (12)$$

The $\Delta DEL$ is a difference between the rate-of-change (dVf/V) of wheel speeds by the load movement of front tires and the rate-of-change (dVr/V) of wheel speeds by the load movement of rear tires, and corresponds to the shift rate of the judgment value, DEL at turning. Further, the shift rate does not include influence by sliding.

The above-mentioned rate-of-changes (dVf/V) and (dVr/V) of wheel speeds are proportional to the loading sensitivities of front tires and the loading sensitivities of rear tires which represent how much the dynamic load radii of tires are respectively changed by loading, by being normalized with the proportional movement amount of a load.

Namely, the rate-of-change (dVf/V) of wheel speeds is proportional to the movement amount of a load and the loading sensitivities of front tires, and the rate-of-change (dVr/V) of wheel speeds is proportional to the movement amount of a load and the loading sensitivities of rear tires. Simultaneously, since the movement amounts of a load of front wheels and rear wheels are proportional to the lateral acceleration, as a result, the above-mentioned equation (12) is represented as follow. Namely, when the lateral acceleration, LG is adapted for an X-axis and $\Delta DEL$ is adapted to a Y-axis, $\Delta DEL$ is proportional to the lateral acceleration, LG, and the slope is proportional to the loading sensitivities of tires. Further, % expression is abbreviated.

$$\Delta DEL=\alpha\times LG\times LSf-\beta\times LG\times LSr=(\alpha\times LSf-\beta\times LSr)\times LG \quad (13)$$

Wherein LG: lateral acceleration
LSf: loading sensitivities of front tires
LSr: loading sensitivities of rear tires
$\alpha$ and $\beta$: coefficients Further, the primary coefficient of the above-mentioned lateral acceleration, LG in $\Delta DEL$ is referred to as C.

$$\text{Namely, } C=\alpha\times LSf-\beta\times LSr \quad (14)$$

Further, since the above-mentioned loading sensitivities, LSf and LSr are lowered by the lowering of the reduced pressure sensitivities of front and rear wheel tires, it is considered that they are proportional to the rate of reduced pressure. When the pressures of four wheels are reduced at the same ratio, the primary coefficient C' after the reduced pressure can be represented by the following:

$$C'=\gamma\times(\alpha\times LSf-\beta\times LSr) \quad (15)$$

Provided that r is $|\gamma|\leq 1$.

(2) Further, since the slide by driving the above-mentioned drive wheel of inside turning which was lighter becomes larger than the slide by driving the drive wheel of outside turning which was heavier, the above-mentioned judgment value, DEL is shifted.

When the movement amounts of a load for front wheels and rear wheels are the same (equal), the influence of the movement amounts of a load is compensated by the calculation of judgment value of the above-mentioned equation (8), therefore the judgment value, DEL after slide correction is not shifted also during turning. However, the front and rear ratio of the movement amounts of a load of a vehicle during turning is not 1, but nearly constant irrespective of the size of the lateral acceleration, therefore the judgment value, DEL after correction is shifted.

However, since the movement amounts of a load is proportional to the lateral acceleration which was generated by turning, the shift rate, $\Delta DEL$ of the judgment value, DEL after correcting the influence of slide is also proportional to the lateral acceleration.

(3) Since the judgment value (DEL) during turning is shifted by the influence of the above-mentioned load movement and the influence of slipping, it is usually corrected as below.

$$\text{Corrected } DEL=DEL-F(f1,f2) \quad (16)$$

Wherein F (f1, f2) is a function of correction factor, f1 is equivalent to the above-mentioned primary coefficient C, and f2 is a factor determined from the relation of the judgment value, DEL with the lateral acceleration×(front and rear wheel ratio−1). Accordingly, C is determined by correcting only the influence of slipping from the DEL value during turning and calculating f1.

Consequently, the reduced pressure sensitivities and loading sensitivities of the dynamic load radii of tires have correlation from the above-mentioned (1) to (3), and the reduced pressure sensitivities of tires can be deduced from said loading sensitivities. Further, the accuracy of the reduced pressure judgment can be improved by carrying out the reduced pressure judgment in accordance with the reduced pressure sensitivities of tires.

Furthermore, the above-mentioned loading sensitivities of the dynamic load radii of tires differ also depending on the kind of tires (a size, the coefficient of flatness and the like). The coefficient of flatness of a tire is a ratio of the sectional height, H of a tire to the maximum width, W of the tire, (H/W)×100(%).

Wherein the shift rate of the above-mentioned judgment value is logically zero when the lateral acceleration is zero, and the relation between the lateral acceleration and the shift rate of the judgment value is logically ought to pass an origin. When the shift rate of the judgment value is divided by the lateral acceleration, the slope is principally determined by the measurement point (measurement value) of one arbitrary point. However, when four wheel tires are simultaneously reduced in pressure by the same amount, the judgment value at going straight ahead becomes zero. Consequently, the judgment value during turning is equal to the shift rate, ΔDEL, therefore when the measurement value is divided by the lateral acceleration, LG, the slope can be calculated. Further, when the judgment value at going straight ahead is not zero and for example, shifted by dDEL, it is required that the shift rate, ΔDEL is calculated by subtracting dDEL from a measured value and divided by the lateral acceleration, LG.

In the present embodiment, since the loading sensitivity being the above-mentioned slope has dependency on speed in like manner as the reduced pressure sensitivity as described later, some of the vehicle speed regions are set (for example, the regions are set as 0 to 90 km/h, 90 to 120 km/h, 120 to 150 km/h, and 150 km/h or more) to determine the loading sensitivity by every vehicle speed region. Since the loading sensitivities thus obtained have little unevenness and good accuracy, the accuracy of the reduced pressure judgment can be improved.

Further, the reduced pressures of tires that could not be conventionally detected because the reduced pressure sensitivity becomes zero at high speed can be detected by comparing the loading sensitivity at high speed with the loading sensitivity at the same vehicle speed region before reduced pressure.

Further, as a method of determining the loading sensitivities by the above-mentioned every vehicle speed region, points of data required for respective speed regions are determined, for example, by setting 0 to 90 km/h, 90 to 120 km/h, 120 to 150 km/h, and 150 km/h or more. For example, they are 90, 30, 30 and 30 in order, and the data are obtained under normal air condition at the respective speed regions. Then, the primary coefficient C and speed (V) are averaged to obtain the data of four points. These are revolved by $aV^2+bV+c$ (speed function) to determine the constants, a, b and c. The loading sensitivities (criteria) at respective speeds can be grasped thus. The reduced pressure judgment can be carried out by comparing these with the current loading sensitivities.

Accordingly, the loading sensitivity-calculating device related to the present embodiment is constituted by an lateral acceleration-calculation means, a shift rate-calculating means of determining the shift rate of a judgment value during turning of a vehicle, and a loading sensitivity-calculating means of determining the loading sensitivity which is a value obtained by dividing the above-mentioned shift rate by the lateral acceleration. The above-mentioned lateral acceleration can be determined by calculating the wheel speeds with a calculation circuit and can be also determined with lateral acceleration sensor. When it is determined with said lateral acceleration sensor, the above-mentioned lateral acceleration-calculation means is a calculation circuit determined with the vehicle speed or the lateral acceleration sensor because the value of the lateral acceleration sensor is calculated with the calculation circuit to determine the lateral acceleration. The loading sensitivity of tires-calculating program functionalizes the above-mentioned control unit 2 as an lateral acceleration-calculation means, a shift rate-calculating means, and a loading sensitivity-calculating means.

Further, the loading sensitivity-calculating device related to the present embodiment can be applied to a detection device of reducing the air pressure of tires which judges reducing the air pressure of tires, by comparing (difference of ratio is compared with a fixed threshold) the loading sensitivities of the dynamic load radii of tires caused by movement of a load during turning in a fixed vehicle speed region, with the loading sensitivities of the dynamic load radii of tires at a new car to which they were preliminarily memorized, or at initialization which is carried out at exchange of tires (at normal air pressure).

For example, as a method of detecting the reduced pressure utilizing the loading sensitivities which were determined by the above-mentioned every speed region, when the loading sensitivities at normal air pressure are represented by the function of speeds, $f(V)=aV^2+bV+c$, an alarm is issued because of the reduced pressures of four wheels when difference is obtained by subtracting $f(V1)$ from the loading sensitivity, $L_{SV1}$ which is determined at a speed of V1 and the result is $|L_{SV1}-f(V1)|>A$, as described beforehand. Herein, A is a threshold which was preliminarily fixed.

Further, the loading sensitivities of the dynamic load radii of tires can be also determined using a yaw rate sensor, in the present invention. For example, when the yaw rate (sensor value) obtained from a yaw rate sensor is set as $Y_R$ and a real turning radius as R' and a vehicle speed as V, it is represented as $$Y_R=V/R'$$

When the change of wheel speed caused by load movement at turning is set as dV and the reciprocal of a turning radius R at left turning calculated from the wheel rotation speed is considered, the equation (17) is obtained from the above-mentioned equation (8), and the change of speed by load movement becomes an error.

$$1/R = (2/T_W)\times \qquad (17)$$
$$\{(V2+dV)-(V1-dV)\}/\{(V2+dV)+(V1-dV)\}$$
$$= (1/T_W)\times\{(V2-V1)+(2\times dV)\}/V$$

Further, $(V1+V2)=V/2$.

On the other hand, when the reciprocal of the turning radius, R' is calculated from a yaw rate, the wheel speeds, V1 and V2 are ought to be not subject to the influence of load movement, therefore it is represented as the equation (18).

$$1/R'=Y_R/V=(1/T_W)\times(V2-V1)/V \qquad (18)$$

The difference between the above-mentioned equation (17) and the equation (18) is represented by the following.

$$1/R-1/R'=(1/T_W)\times dV/V \qquad (19)$$

The loading sensitivity can be determined by normalizing the above-mentioned dV/V with the movement amount of a load (lateral acceleration).

Consequently, the accuracy of the reduced pressure judgment can be improved by providing some vehicle speed regions in like manner as the fore-mention and determining the loading sensitivity by every vehicle speed region.

Further, the above-mentioned lateral acceleration can be measured with the lateral acceleration sensor, and can be also determined by multiplying a vehicle speed to a yaw rate from the yaw rate sensor.

Thus, in the present embodiment, the loading sensitivity of tires-calculating program can be also constituted by a reciprocal-calculating means of determining the reciprocal of a turning radius obtained from the wheel rotational speed of a vehicle and the reciprocal of a turning radius obtained from the yaw rate of the above-mentioned vehicle, and a loading sensitivity-calculating means of determining the loading sensitivity which is a value obtained by dividing a difference between the reciprocal of a turning radius obtained from the above-mentioned wheel rotational speed by every vehicle speed region and the reciprocal of a turning radius obtained from the above-mentioned yaw rate, by the lateral acceleration. In this case, the loading sensitivity of tires-calculating program functionalizes also the control unit as a reciprocal-calculating means and a loading sensitivity-calculating means.

Then, the present invention is illustrated based on Examples, but the invention is not limited to these Examples.

EXAMPLE 1

Relation between the loading sensitivity and the reduced pressure sensitivity in accordance with air pressures and vehicle speeds was studied with respect to tires having nearly same outer diameters and the different coefficients of flatness (for example, 185/70R14 88S (Tire T1), 205/60R16 92H (Tire T2), or 225/50R17 94V (Tire T3), or the like); tires with a size having so-called compatibility.

In the present Example, drum tests regarding Tires, T1, T2 and T3, were carried out by setting a case that the air pressures of whole wheel tires were a normal air pressure of 200 kPa and a reduced pressure of 140 kPa and a case that the vehicle speeds are 50 km/h and 100 km/h.

In cases of the above-mentioned air pressures (200 kPa and 140 kPa) and the vehicle speeds (50 km/h and 100 km/h), the loading sensitivities in the present Example were determined by dividing the change of dynamic load radius when a wheel load was changed by 50%, by the dynamic load radius at a wheel load of 100%. Further, the loaded load at 200 kPa (L1 value-prescribed load) is prescribed with Tire L1 (Load index) by JATMA, and it is 4.95 kN for Tire T1, 5.54 kN for Tire T2 and 5.88 kN for Tire T3. For example, the dynamic load radius at a wheel load of 100% with respect to Tire T2 is 314.9 mm. When the air pressure is 200 kPa and the vehicle speed is 100 km/h, the dynamic load radius is 317.0 mm by a rotational number ratio of a drum having a known peripheral length to a tire when the wheel load of 50% was changed at 2.77 kN, therefore the change was represented with a ratio for 314.9 mm to determine 0.66% as the loading sensitivity.

Similarly, the loading sensitivities were determined with respect to cases that the air pressure is 200 kPa and the vehicle speed is 50 km/h and the air pressure is 140 kPa and the vehicle speeds are 100 km/h and 50 km/h.

Further, with respect to Tires T1 and T3, the loading sensitivities were determined by determining the dynamic load radius when 2.77 kN was changed from a wheel load of 100% in like manner as Tire T1, and then by dividing it by the dynamic load radii of 297.4 mm and 317.4 mm at a load of 100%.

On the other hand, the reduced pressure sensitivity was determined by dividing a value (the change of dynamic load radius) which was obtained by subtracting a dynamic load radius at an air pressure of 140 kPa from a dynamic load radius at an air pressure of 200 kPa, by the dynamic load radius at an air pressure of 200 kPa, in a condition in which 75% of the loaded load at 200 kPa (L1 value-prescribed load) was loaded. For example, with respect to Tire T2, a dynamic load radius of 314.2 mm at an air pressure of 140 kPa is subtracted from a dynamic load radius of 315.7 mm at an air pressure of 200 kPa, in a condition in which 75% was loaded (4.155 kN). Successively, the subtracted value was divided by 315.7 mm to obtain 0.48% as the reduced pressure sensitivity.

Figure 3:
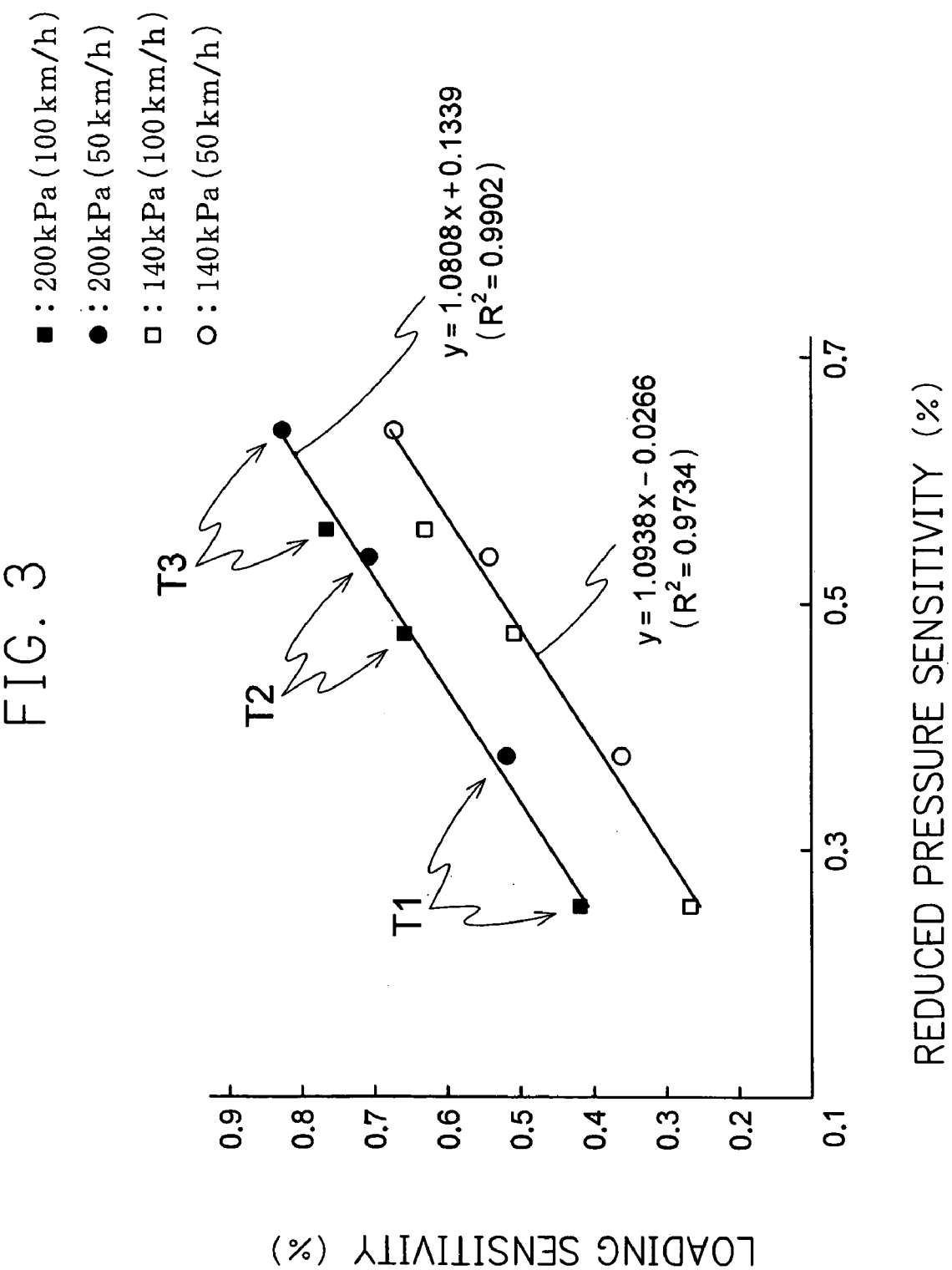
FIG. 3 is a chart comparing correlation between the reduced pressure sensitivity and the loading sensitivity of the dynamic load radii of tires, and the loading sensitivities at a normal air pressure (200 kPa) and at a reduced pressure (140 kPa).

Consequently, as shown in FIG. 3, there is high correlation between the reduced pressure sensitivity and the loading sensitivity, and there is the following relation. Further, in FIG. 3, x is the reduced pressure sensitivity, y is the loading sensitivity and R is a relative coefficient.

Loading sensitivity at higher inner pressure (200 kPa)>Loading sensitivity at lower inner pressure (140 kPa)

Namely, it was grasped that the reduced pressure sensitivity is correlated with the loading sensitivity as above-mentioned, and the loading sensitivity at lower inner pressure is smaller than the loading sensitivity at normal air pressure (higher inner pressure).

Accordingly, in the present embodiment, a memory means, a sensitivity-calculating means of determining the loading sensitivity during turning, a sensitivity-comparing means of comparing the loading sensitivity during said turning with the loading sensitivity at initialization which are preliminarily memorized, and the first judgment means of judging reducing the air pressure of tires based on the result of said comparison are provided. Further, the loading sensitivity of tires-calculating program related to the present embodiment functionalizes the above-mentioned control unit 2 as a memory means, a sensitivity-calculating means, a sensitivity-comparing means and the first judgment means.

Thus, simultaneous reduced pressure (the reduced pressures of whole wheels) can be detected by memorizing the loading sensitivity at initialization which is carried out at a new car and at exchange of tires (at normal air pressure), periodically measuring the loading sensitivities of the dynamic load radii of tires by load movement during turning, and comparing them with the above-mentioned initial loading sensitivity which is memorized.

A region judging reducing the air pressure of tires is broadened using a conventional device together with the device related to the present embodiment, and the accuracy of the reduced pressure judgment can be improved. As the above-mentioned comparison, for example, a method of comparing difference or a ratio with a fixed threshold can be used. Further, the relation between the reduced pressure sensitivity and the loading sensitivity just after initialization is respectively determined by running at initialization, and they shall be memorized in the above-mentioned control unit 2, ROM 2c.

EXAMPLE 2

Figure 4:
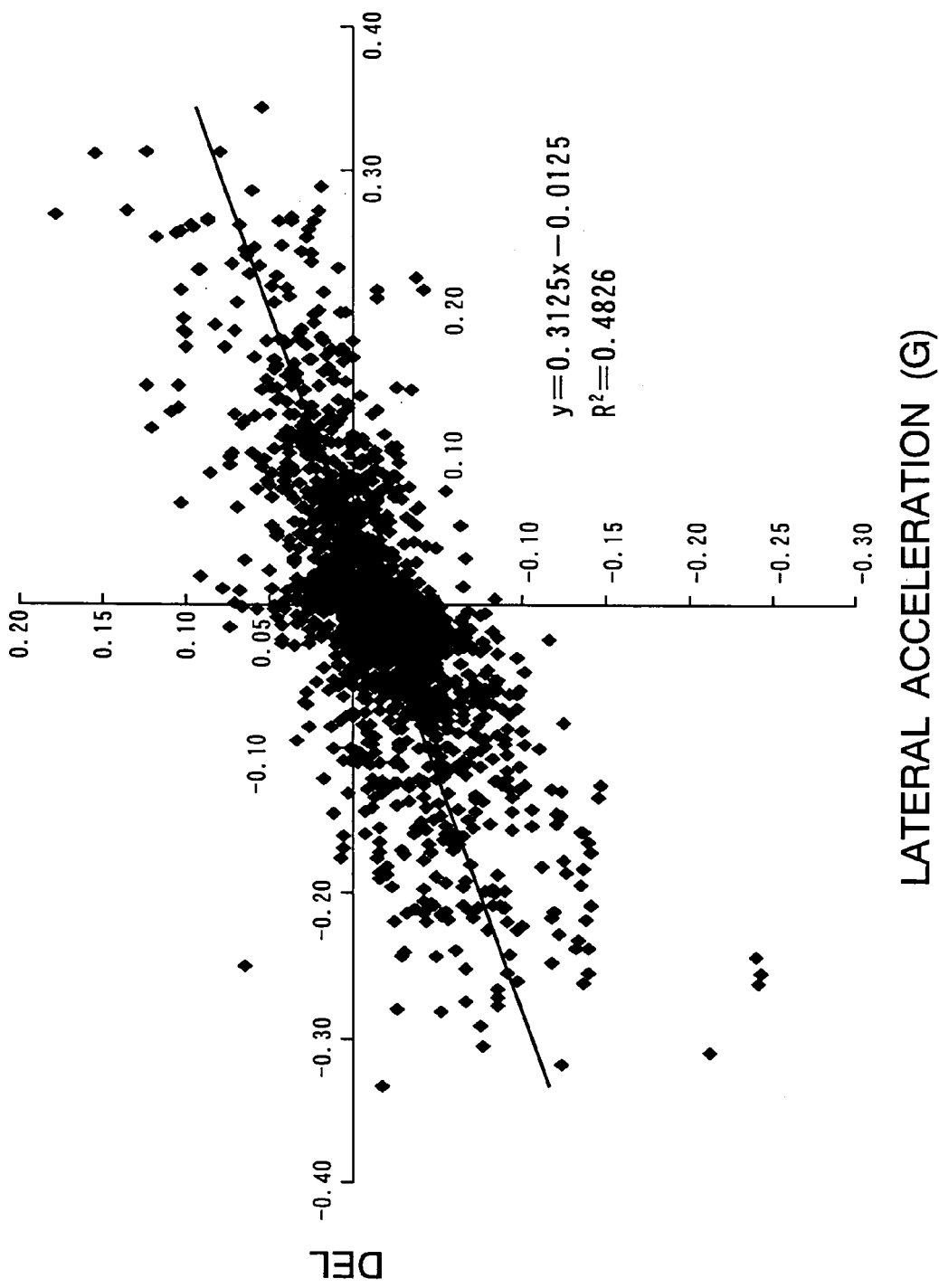
FIG. 4 is a chart showing relation between the lateral acceleration and the judgment value, DEL in a normal air pressure condition.
Figure 5:
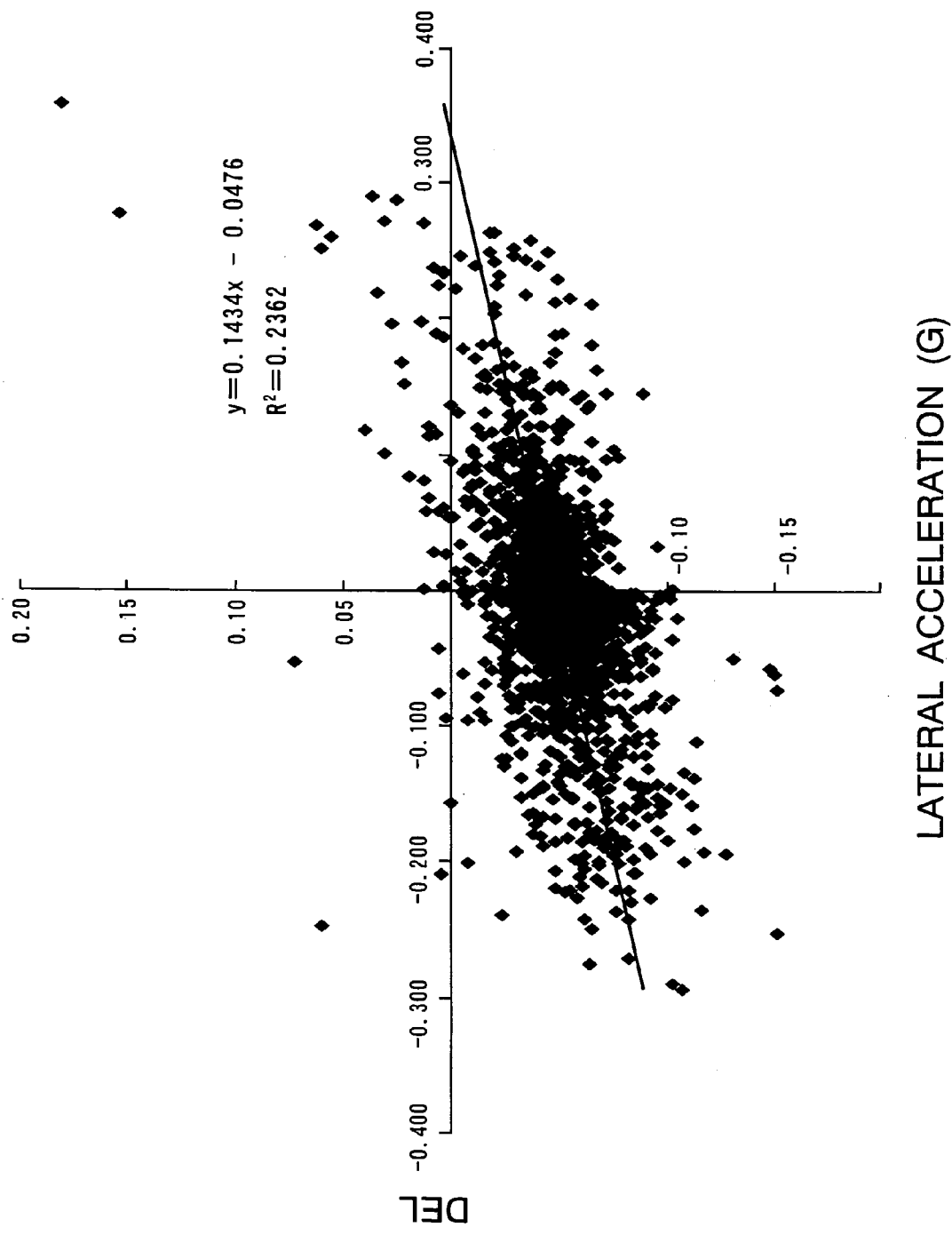
FIG. 5 is a chart showing relation between the lateral acceleration and the judgment value, DEL in a condition in which all wheels are a reduced pressure of 50%.

A FF car (tire dimension: Tire 185/70R14) of 1800 cc was prepared, and the judgment value, DEL after correction of sliding and the lateral acceleration were determined with respect to running (going and returning between Okayama test course and Tsuyama city) in a condition of normal air pressure (200 kPa) and a condition of reduced pressure of 50% for the whole wheels. As a result, as shown in FIG. 4 and FIG. 5, a slope at normal air pressure is 0.3125, and on the other hand, a slope at reduced pressures for the whole wheels was 0.1434 and small. Thus, it was grasped that the reduced pressures for the whole wheels could be detected from the slope of the judgment value, DEL during turning against the lateral acceleration.

For example, when the reduced pressure judgment of four wheel tires is set at a reduced pressure of 30%, 0.3125×30÷50=0.1875 is set as an alarming threshold, and when the slope is smaller than the threshold, an alarm shall be issued, and then it can be also judged that four wheel tires are reduced in pressure by 30%.

Accordingly, the slope of the judgment value, DEL (at no drive) during turning against the lateral acceleration is periodically measured after initialization, and the slope at real running is compared with the initial slope, therefore reduced pressure, for example, the reduced pressure for the whole wheels can be deduced. The reduced pressure sensitivities of tires mounted can be also deduced by comparing the slope at initialization with the slope at last initialization.

In the present embodiment, a relation equation-calculating means of determining a relation equation between the lateral acceleration and a judgment value, a comparison means of comparing said relation equation with the relation equation between a judgment value and the accelerations to a horizontal direction at initialization which are preliminarily memorized, and a judgment means of judging reducing the air pressure of tires based on the result of said comparison are provided. Further, the judgment program of the reduced pressures of tires related to the present embodiment functionalizes the above-mentioned control unit 2 as a memory means, a relation equation-calculating means, a comparison means and a judgment means.

A region judging reducing the air pressure of tires is broadened and the accuracy of the reduced pressure judgment can be improved by using a conventional device, for example, a device detecting the reduced pressure of coaxial two wheels and the reduced pressure of two wheels at the same side because the loading sensitivity is lowered even if the coaxial two wheels and the two wheels at the same side are reduced in pressure, together with the device related to the present embodiment.

For example, the reduced pressure of coaxial two wheels can be judged based on relation between the comparison value of said second slip rate and a fixed threshold, by determining a slip rate when the acceleration of a vehicle is within a fixed range nearby zero, and then comparing said slip rate with a slip rate at a normal air pressure which was preliminarily determined. Further, the reduced pressures of two wheels at the same side can be judged based on relation between said comparison value and a fixed threshold, after comparing the wheel speeds of whole left wheels of a vehicle running straight ahead, with the wheel speed of whole right wheels.

EXAMPLE 3

Relation between the loading sensitivity and the reduced pressure sensitivity in accordance with air pressures and vehicle speeds was studied with respect to tires having nearly same outer diameters and the different coefficients of flatness (for example, 195/65R15, 205/65R15, 205/60R16, 215/50R17 or 215/45R17, or the like); tires with a size having so-called compatibility.

In the present Example, drum tests were carried out by setting a case that the air pressures of four wheel tires were 196 kPa and a reduced pressure of 30% was 137 kPa and a case that the vehicle speeds were 80 km/h, 120 km/h and 160 km/h.

In cases of the above-mentioned air pressures (196 kPa and 137 kPa) and the vehicle speeds (80 km/h, 120 km/h and 160 km/h), the loading sensitivities in the present Example were determined by dividing the change of dynamic load radius when a wheel load was changed from 2.94 kN to 5.39 kN, by the dynamic load radius at a wheel load of 4.41 kN. Further, the loaded load at 196 kPa (L1 value-prescribed load) is prescribed with Tire L1 (Load index) by JATMA, and is 5.10 kN for Tire 195/65R15 89H,
5.54 kN for Tire 205/65R15 92H,
5.44 kN for Tire 205/60R16 91V,
5.73 kN for Tire 215/50R17 93V, and
4.80 kN for Tire 215/45R17 87W.

However, measurement was carried out under the above-mentioned condition considering the condition of used load of a vehicle.

For example, with respect to Tire 205/60R16, the dynamic load radius at a wheel load of 5.39 kN is 313.1 mm. Since the dynamic load radius at a wheel load of 2.94 kN is 315.1 mm when the air pressure was 196 kPa and the vehicle speed was 80 km/h, this was represented by a ratio for the dynamic load radius of 313.7 mm when a wheel load was 4.41 kN, to obtain about 0.63% as the loading sensitivity. Further, the measurement of the dynamic load radius with a drum test machine is carried out by calculating from the rotational number ratio of a drum and a tire whose circumference was known.

Similarly, the loading sensitivities were determined with respect to a case that the air pressure was 196 kPa and the vehicle speeds were 120 km/h and 160 km/h and a case that the air pressure was 137 kPa and the vehicle speeds were 80 km/h, 120 km/h and 160 km/h.

Further, with respect to other Tires, the loading sensitivities were determined in like manner as Tire 205/60R16.

On the other hand, the reduced pressure sensitivity was determined by dividing a value (the change of dynamic load radius) which was obtained by subtracting a dynamic load radius at an air pressure of 137 kPa from a dynamic load radius at an air pressure of 196 kPa, by the dynamic load radius at an air pressure of 196 kPa, in a condition in which 4.41 kN was loaded at 196 kPa.

For example, with respect to Tire 205/60R16, a dynamic load radius of 311.9 mm at an air pressure of 137 kPa was subtracted from a dynamic load radius of 313.7 mm at an air pressure of 196 kPa, in a condition in which 4.41 kN was loaded. Successively, the subtracted value was divided by 313.7 mm to obtain about 0.56% as the reduced pressure sensitivity.

Figure 6:
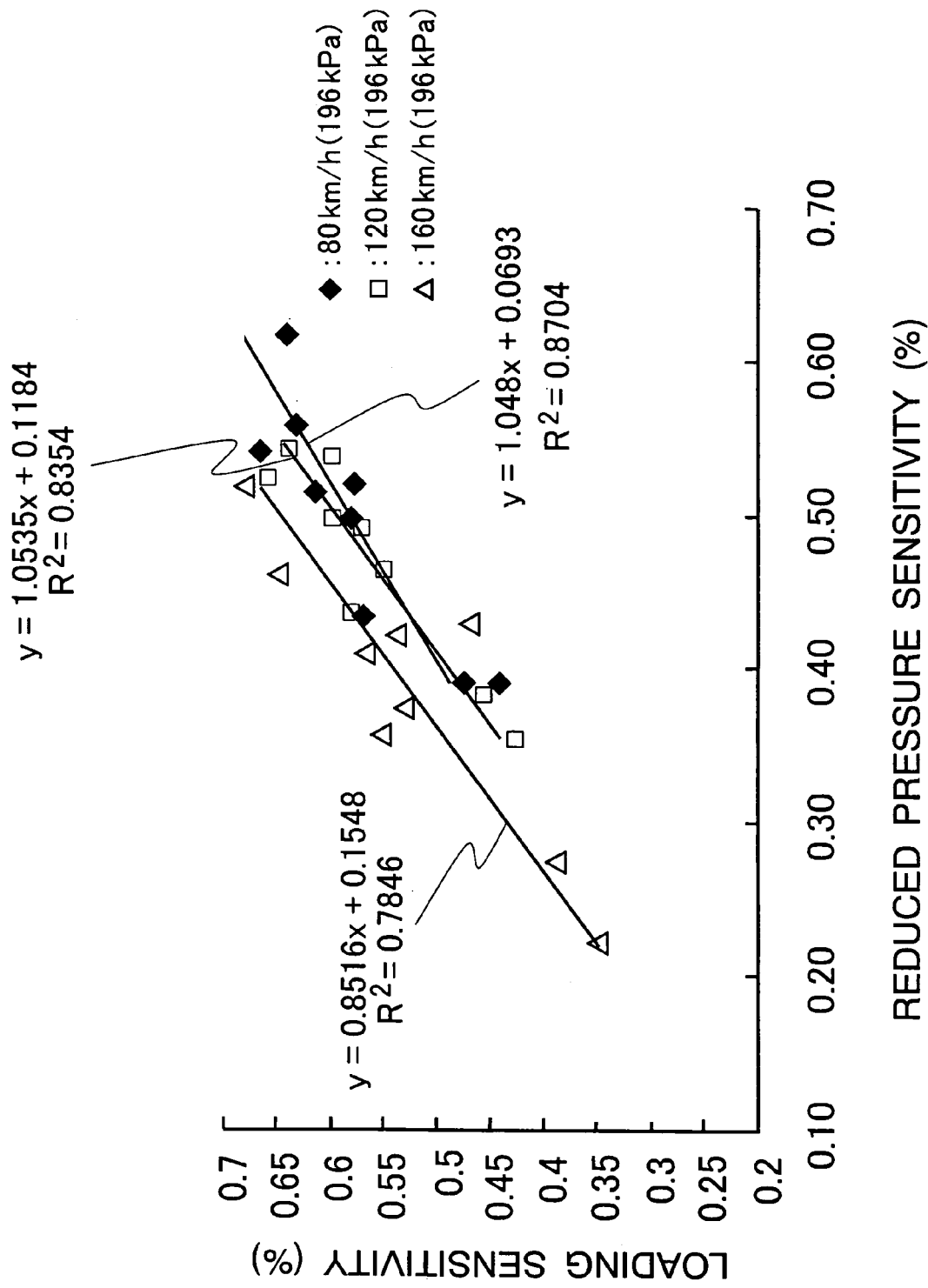
FIG. 6 is a chart showing correlation between the loading sensitivity and the reduced pressure sensitivity of the dynamic load radii of tires at an air pressure (196 kPa).
Figure 7:
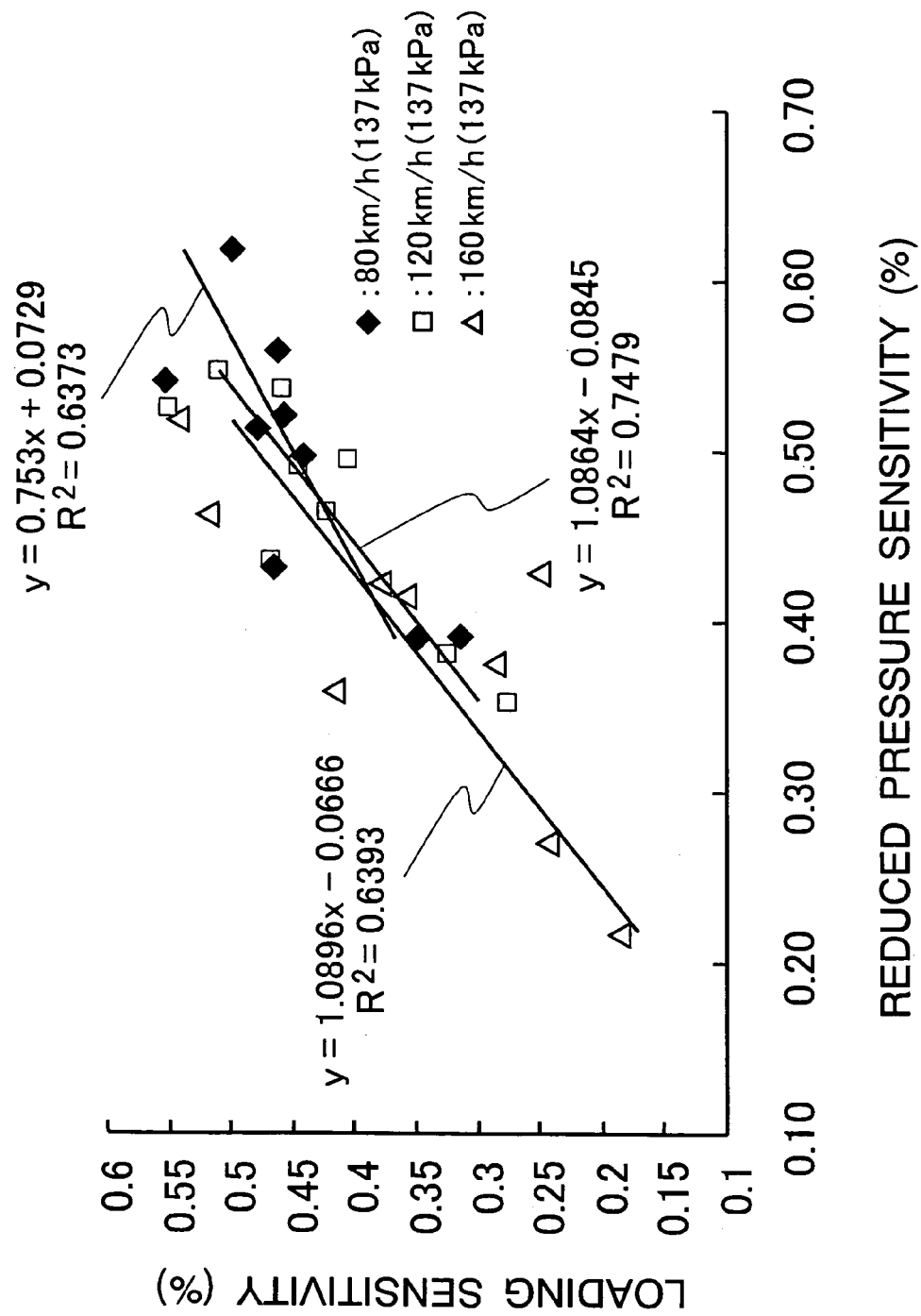
FIG. 7 is a chart showing correlation between the loading sensitivity and the reduced pressure sensitivity of the dynamic load radii of tires at an air pressure (137 kPa).

As shown in FIG. 6 and FIG. 7, it was grasped that there is high correlation between the reduced pressure sensitivity and the loading sensitivity.

Thus, the reduced pressure sensitivities of the dynamic load radii of tires mounted are deduced by preliminarily determining and memorizing the relation between the reduced pressure sensitivities and the loading sensitivities concerning tires having compatible size which are possibly mounted on a vehicle, and comparing the loading sensitivities at initialization which is carried out at a new car and at exchange of tires (at normal air pressure), with the loading sensitivities of tires having compatible size which were memorized.

Further, the coefficient of reduced pressure for alarming can be appropriately set by changing an alarming threshold in accordance with the reduced pressure sensitivity, and the accuracy of the reduced pressure judgment can be improved. Furthermore, since excessive alarms can be suppressed, an accurate alarm can be issued in a vehicle having many tire size settings even if tires are changed.

Consequently, in the present embodiment, a memory means, a sensitivity-calculating means of determining the loading sensitivity during turning, a sensitivity-comparing means of comparing the loading sensitivity of the dynamic load radii of tires caused by movement of a load during the turning with the loading sensitivity of the dynamic load radii of various tires (tires having a compatible size) which are preliminarily memorized, a sensitivity-deducing means of deducing the reduced pressure sensitivity of the dynamic load radii of the above-mentioned tires based on the result of the comparison, and a judgment means of judging reducing the air pressure of tires based on the result of said deduction are provided. The judgment program of the reduced pressures of tires related to the present embodiment functionalizes the above-mentioned control unit 2 as a memory means, a sensitivity-calculating means, a sensitivity-comparing means, a sensitivity-deducing means, and a judgment means. Furthermore, the relation between the reduced pressure sensitivities and the loading sensitivities of various tires are preliminarily determined by running tests, respectively, and it shall be memorized in the above-mentioned control unit 2, ROM 2C.

Further, in the present embodiment, it is preferable to further provide a threshold-changing means of changing a threshold for judging the above-mentioned air pressure lowering of tires by the above-mentioned reduced pressure sensitivity. When the above-mentioned threshold-changing means is provided, the above-mentioned control unit 2 shall be functionalized as the threshold-changing means.

The change of the threshold-changing means is carried out, for example, as follow, and the coefficient of reduced pressure for alarming is set.

The relation between the DEL value and the lateral acceleration with respect to tires which were set for the vehicle is preliminarily measured in a fixed air pressure condition to determine a slope (the loading sensitivity), and simultaneously, the DEL value (the reduced pressure sensitivity) at a reduced pressure of 30% is also determined.

Now, when the slope between the lateral acceleration and the DEL value of a tire having the highest reduced pressure sensitivity among tires which were mounted on the vehicle was 0.17 and the DEL value at reduced pressure in which the coefficient of reduced pressure was 0.3 (the reduced pressure sensitivity), and the slope of relation between the lateral acceleration and the DEL value of a tire having the lowest reduced pressure sensitivity was 0.13 and the DEL value at a reduced pressure of 30% was 0.18, the threshold of alarm is set as shown below.

TABLE 1

| Loading Sensitivity (X) | Threshold |
|---|---|
| $0.18 > X \geq 0.16$ | 0.30 |
| $0.16 > X \geq 0.14$ | 0.24 |
| $0.14 > X \geq 0.12$ | 0.18 |

When the slope of relation between the lateral acceleration and the DEL value was 0.15 at initialization which was carried out at a new car or tire exchange, an alarm can be accurately issued at a reduced pressure of 30% if the threshold is set at 0.24.

Further, the threshold for various tires and the coefficient of reduced pressure are memorized in the above-mentioned control unit 2, ROM 2c, for example, as the discrimination table of tires.

EXAMPLE 4

Figure 8:
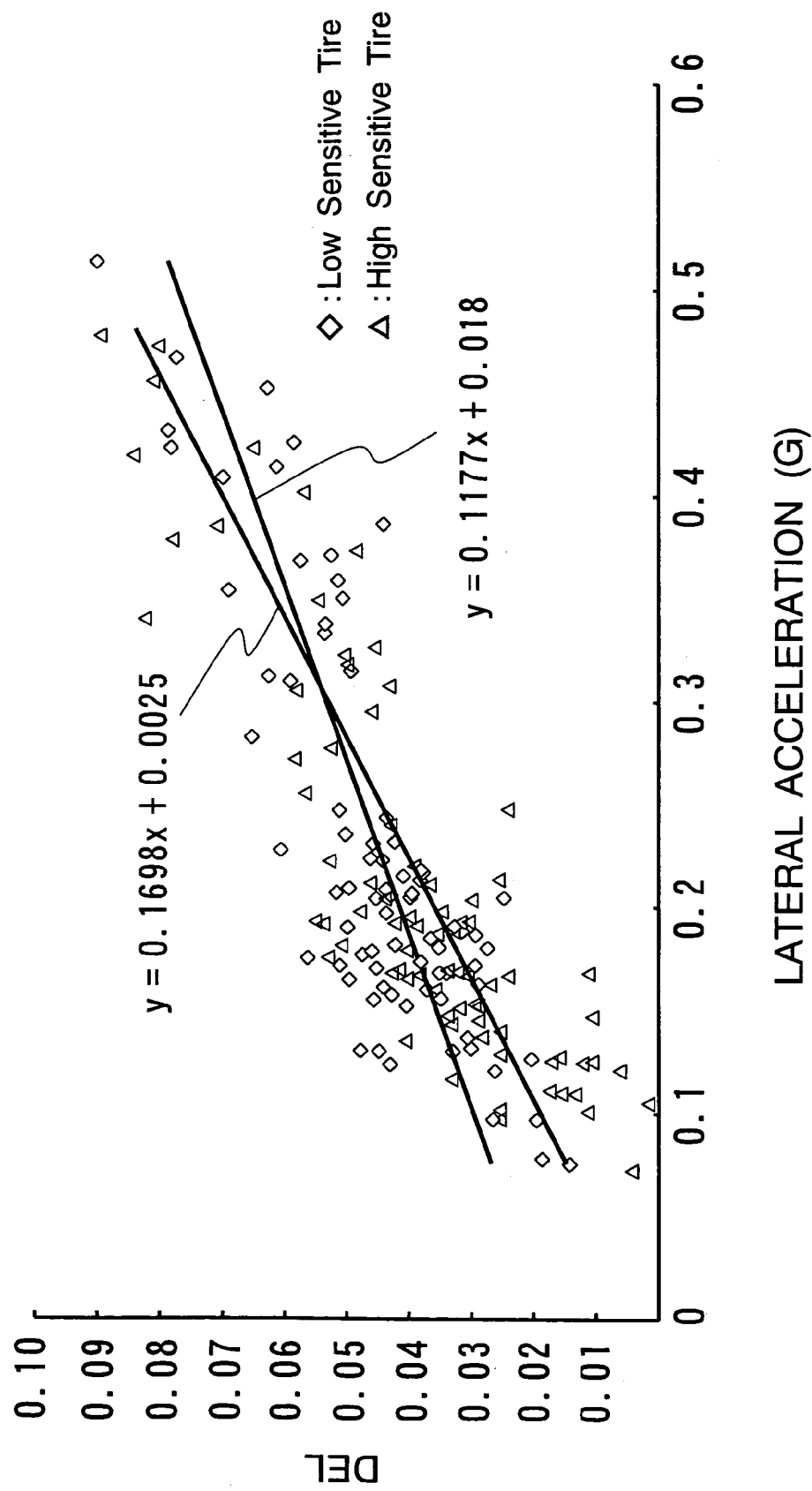
FIG. 8 is a chart showing relation between the lateral acceleration and the judgment value in lowly sensitive tires and highly sensitive tires.

A FF car of 1800 cc was prepared, and the judgment value, DEL excluding the influence of sliding and the lateral acceleration were determined with respect to running (within Okayama test course) with lowly sensitive tires (tire dimension: Tire 205/65R15) and highly sensitive tires (tire dimension: Tire 205/60R16) in a condition of normal air pressure. As a result, as shown in FIG. 8, the slope of highly sensitive tires is 0.170, and on the other hand, the slope of lowly sensitive tires was 0.118 and small. Thus, it was grasped that the reduced pressure sensitivities of tires can be deduced from the slope of the judgment value, DEL during turning against the lateral acceleration to discriminate tires.

Thus, the reduced pressure sensitivities of the dynamic load radii of tires mounted are deduced by measuring the slope of judgment value (judgment value at non drive) during turning against the lateral acceleration at initialization which is carried out at a new car and at exchange of tires (at normal air pressure), and comparing this with the slope of various tires which were preliminarily memorized.

Further, the coefficient of reduced pressure for alarming is set by changing a threshold in accordance with the reduced pressure sensitivity in like manner as the above-mentioned Example 3, and the accuracy of the reduced pressure judgment can be improved. Furthermore, since excessive alarms can be suppressed, an accurate alarm can be issued in a vehicle having many tire size settings even if tires are changed.

Consequently, in the other embodiment of the present invention, a memory means, a relation equation-calculating means of determining a relation equation between lateral acceleration and a judgment value, a comparison means of comparing said relation equation with the relation equation between the judgment value and the accelerations to a horizontal direction of various tires which are preliminarily memorized, a sensitivity-deducing means of deducing the reduced pressure sensitivity of the dynamic load radii of the above-mentioned tires based on the result of said comparison, and a judgment means of judging reducing the air pressure of tires based on the result of said deduction are provided. Further, it is preferable that a threshold-changing means of changing a threshold for judging the above-mentioned air pressure lowering of tires by the above-mentioned reduced pressure sensitivity is provided. The judgment program of the reduced pressures of tires functionalizes the above-mentioned control unit 2 as a memory means, a relation equation-calculating means, a comparison means, a sensitivity-deducing means, and a judgment means.

EXAMPLE 5

Figure 9:
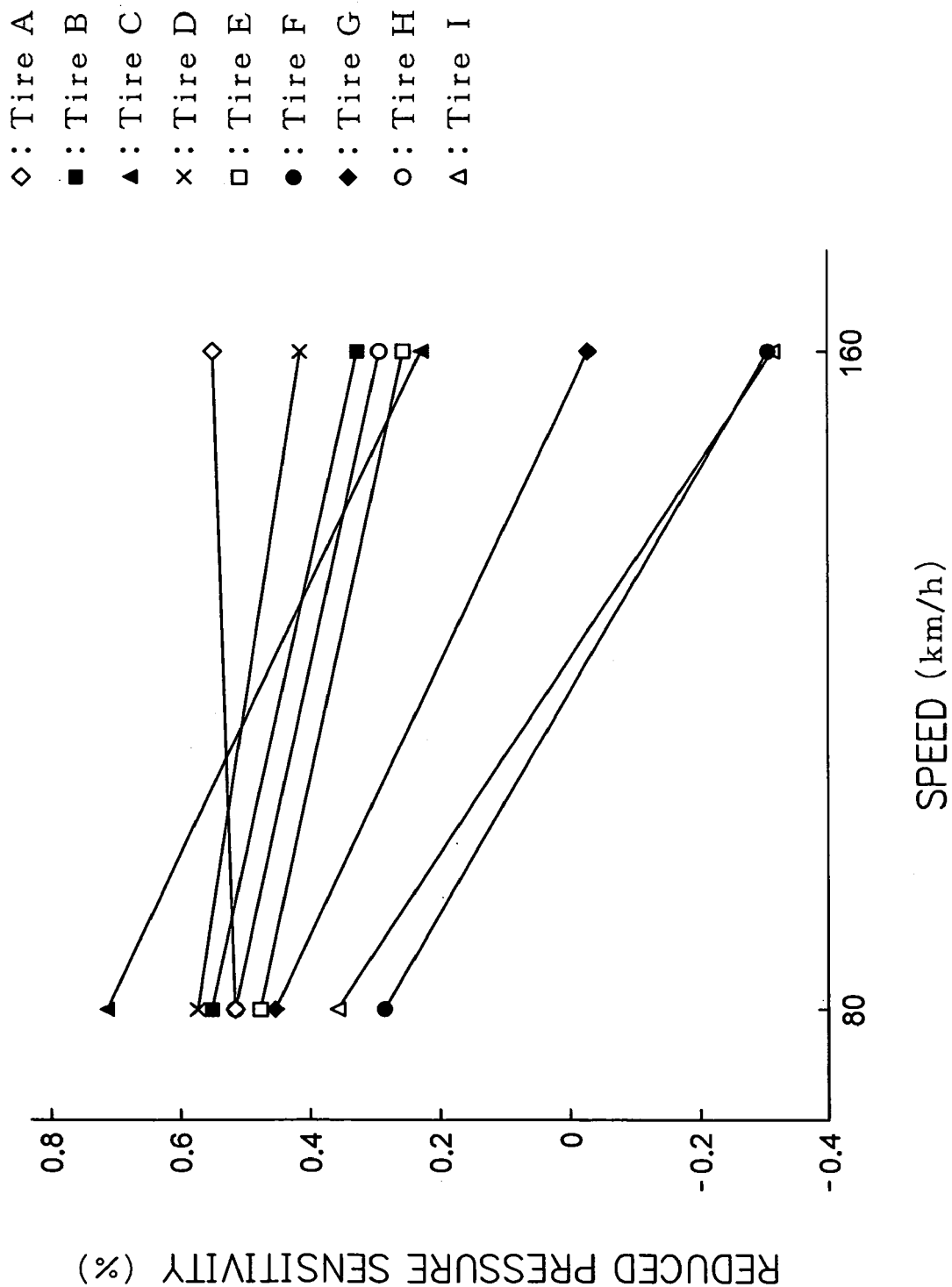
FIG. 9 is a chart showing relation between a speed and the reduced pressure sensitivity of the dynamic load radii of tires.

In Example 5, drum tests regarding 9 kinds of Tires, A to I which were shown in Table 2 were carried out by setting a case that the air pressures of whole wheel tires were a normal air pressure (196 kPa) and the vehicle speeds were 80 km/h and 160 km/h, and the relation between the speed and the reduced pressure sensitivities of the dynamic load radii of tires was studied. The result is shown in FIG. 9. It can be grasped from FIG. 9 that the reduced pressure sensitivity depends on the speed.

TABLE 2

| Type | Tire Size |
|---|---|
| Tire A | 215/50R17 91V Summer Tire 1 |
| Tire B | 215/50R17 91V Summer Tire 2 |
| Tire C | 215/50R17 91Q Studless winter tire |
| Tire D | 205/60R16 92H Summer Tire 1 |
| Tire E | 205/60R16 92H Summer Tire 2 |
| Tire F | 205/60R16 92Q Studless winter tire |
| Tire G | 205/65R15 94H Summer Tire 1 |
| Tire H | 205/65R15 94H Summer Tire 2 |
| Tire I | 205/65R15 94Q Studless winter tire |

The reduced pressure sensitivities in Example 5 were determined by dividing the change of the dynamic load radii when the air pressure was reduced in pressure from 196 kPa (normal air pressure) to 137 kPa, by the dynamic load radii at 196 kPa and representing them by %. The load was 4.41 kN.

Figure 10:
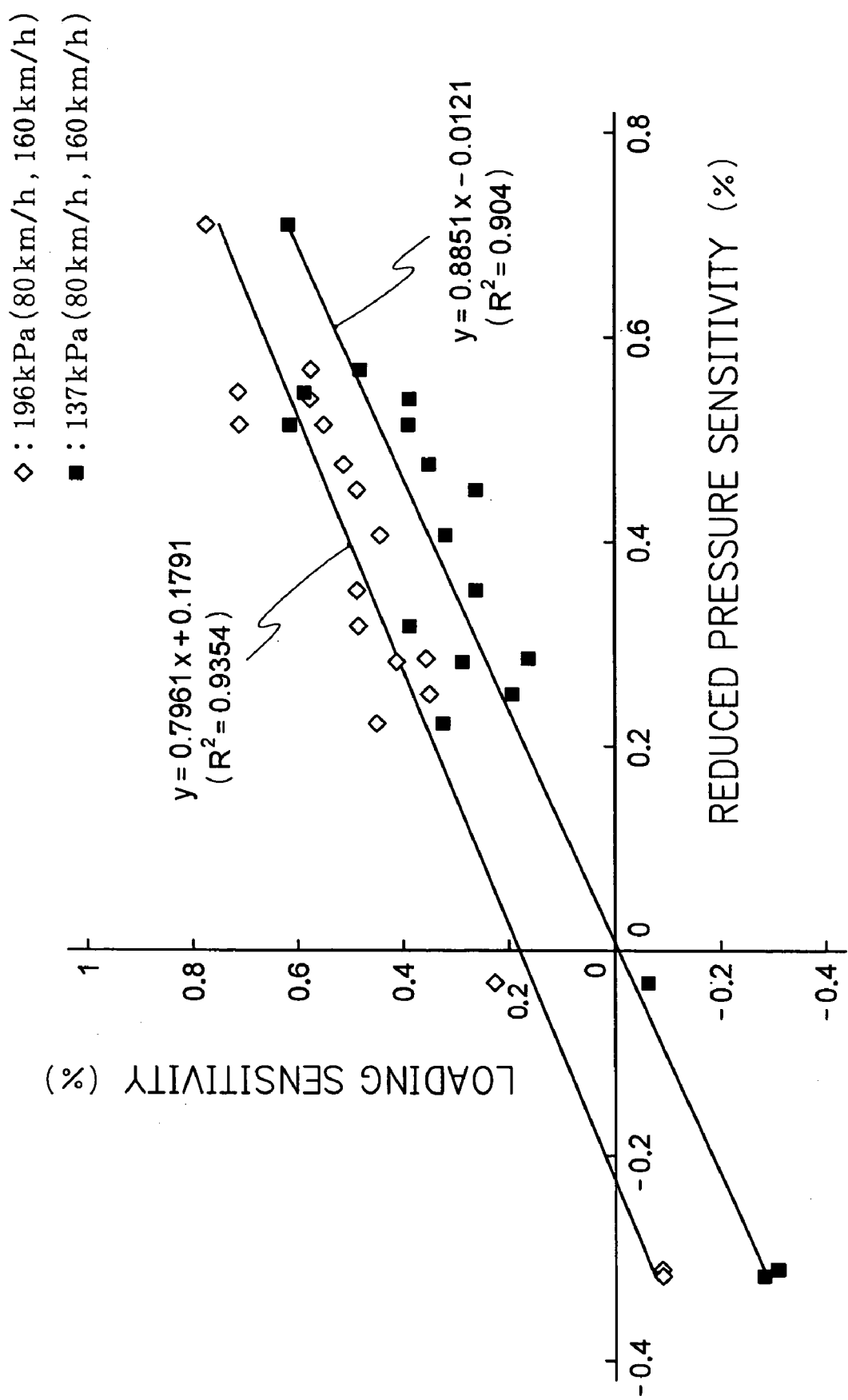
FIG. 10 is a chart showing relation between the reduced pressure sensitivity and the loading sensitivity of the dynamic load radii of tires.

Then, drum tests regarding the same Tires as the abovementioned ones were carried out by setting a case that the a normal air pressure was 196 kPa and a reduced pressure was 137 kPa, a case that the vehicle speeds were 80 km/h and 160 km/h, and a case that the loads were 2.94 kN and 5.39 kN, to study the relation between the reduced pressure sensitivities and the loading sensitivities of the dynamic load radii of tires. The result is shown in FIG. 10. R in FIG. 10 is correlative coefficients.

As grasped from FIG. 10, the correlation between the reduced pressure sensitivity and the loading sensitivity is not damaged even if the speed is changed. Namely, it can be grasped from FIG. 10 that the reduced pressure sensitivity and the loading sensitivity have speed dependency.

Accordingly, it is grasped that the loading sensitivity should be also measured by every vehicle speed or every region. Further, it is grasped from FIG. 10 that reduced pressure detection can be carried out using the loading sensitivity under a running condition by which detection has been conventionally unable because the loading sensitivity has difference between at 196 kPa and at 137 kPa even though the reduced pressure sensitivity is zero.

Further, the loading sensitivity was represented by % by dividing the difference of the dynamic load radius at 2.94 kN and the dynamic load radius at 5.39 kN, by the dynamic load radius at 2.94 kN. This was carried out at speeds of 80 km/h and 160 km/h and at air pressures of 196 kPa and 137 kPa.

Furthermore, the reduced pressure detection can be carried out under a running condition by which detection has been conventionally unable, by applying a method of measuring the loading sensitivity by every vehicle speed or every region in Example 5, to Examples 1 to 4, and reducing the air pressure of tires come to be able to be widely detected.

According to the present invention, the reduced pressures of the whole wheels can be detected.

Since the reduced pressure sensitivities of tires can be deduced according to the present invention, the coefficient of reduced pressure for alarming can be appropriately set by changing a threshold in accordance with the reduced pressure sensitivities, and the accuracy of the reduced pressure judgment can be improved. Further, since excessive alarms can be suppressed, an alarm with good accuracy can be issued even if tires are changed in a vehicle having many setting tire sizes.

Furthermore, according to the present invention, the loading sensitivities in a vehicle velocity at turning can be accurately determined by memorizing the loading sensitivities which are values obtained by dividing the shift rate of judgment values by lateral acceleration, by every vehicle speed region, since the loading sensitivities have dependency on speed in like manner as the reduced pressure sensitivities.

Further, the loading sensitivities in a vehicle speed at turning can be accurately determined by memorizing the loading sensitivities which are values obtained by dividing the loading sensitivity which is a value obtained by dividing difference between the reciprocal of a turning radius obtained from the wheel rotational speed by every vehicle speed region and the reciprocal of a turning radius obtained from the yaw rate, by the above-mentioned lateral acceleration, by every vehicle speed region.

Accordingly, the accuracy of the reduced pressure judgment can be improved by improving the accuracy of the loading sensitivities.

What is claimed is:

1. A method for detecting decompression of tires based on rotational speed of wheels mounted on a vehicle, comprising the steps of:
   determining rotational speeds of said wheels;
   memorizing the rotational speeds of said wheels;
   determining loading sensitivity of dynamic load radii of said tires caused by movement of a load during turning of said vehicle;
   comparing the loading sensitivity of dynamic load radii of said tires caused by movement of a load during said turning with predetermined loading sensitivity of dynamic load radii of said tires during normal air pressure;
   judging decompression of said tires based on a result of said comparison; and
   providing an indication of decompression of said tires.

2. The method for detecting decompression of tires of claim 1 further comprising a step of determining loading sensitivity of dynamic load radii of said tires caused by movement of a load during turning of said vehicle by calculating a relation equation between lateral acceleration of said vehicle and a relative comparison between sums of said wheel rotational speeds on a pair of diagonals of said vehicle.

3. The method for detecting decompression of tires of claim 1 further comprising the steps of:
   comparing the loading sensitivity of the dynamic load radii of tires caused by movement of a load during turning of said vehicle with predetermined loading sensitivities of the dynamic load radii of various tires; and
   judging reduction of air pressure of tires based on the result of said comparison, including the steps of:
      deducing reduced pressure sensitivity of the dynamic load radii of said tires based on the result of said comparison, and
      judging reduction of air pressure of said tires based on a result of said deduction.

4. The method for detecting decompression of tires of claim 3 further comprising a steps of determining loading sensitivity of dynamic load radii of said tires caused by movement of a load during turning of said vehicle by calculating a relation equation between lateral acceleration of said vehicle and a relative comparison between sums of said wheel rotational speeds on a pair of diagonals of said vehicle.

5. The detection method of reducing the air pressure of tires of claim 3 or 4, further comprising a step of changing a threshold for judging decompression of said tires by said reduced pressure sensitivity.

6. The method for detecting decompression of tires of claim 1 and further comprising determining the loading sensitivity of the dynamic load radii of tires by by loading fluctuation of tires, comprising the steps of:
   determining lateral acceleration of a vehicle during turning of said vehicle;
   determining a shift rate of a judgment value calculated by relative comparison between sums of said wheel rotational speeds on a pair of diagonals of said vehicle during turning of the vehicle; and
   determining loading sensitivity obtained by dividing said shift rate by lateral acceleration at every vehicle speed region.

7. The method for detecting decompression of tires of claim 1 and further comprising determining the loading sensitivity of the dynamic load radii of tires by loading fluctuation of tires, comprising the steps of:
  determining lateral acceleration of a vehicle during turning of said vehicle;
  determining a shift rate of a judgment value calculated by relative comparison between sums of said wheel rotational speeds on a pair of diagonals of said vehicle during turning of the vehicle, including the step of:
    determining a yaw rate of said vehicle;
    determining reciprocal of a turning radius obtained from wheel rotational speed of said vehicle and reciprocal of a turning radius obtained from said yaw rate; and
    determining a value corresponding to said shift rate calculated by a difference between the reciprocal of a turning radius obtained from said wheel rotational speed and the reciprocal of a turning radius obtained from said yaw rate; and
  determining loading sensitivity obtained by dividing said shift rate by lateral acceleration at every vehicle speed region.

8. The method for detecting decompression of tires of claim 1 and further comprising determining the loading sensitivity of the dynamic load radii of tires by loading fluctuation of tires, comprising the steps of:
  determining lateral acceleration of a vehicle during turning of said vehicle;
  determining a shift rate of a judgment value calculated by relative comparison between sums of said wheel rotational speeds on a pair of diagonals of said vehicle during turning of the vehicle, including the steps of:
    determining reciprocal of a turning radius obtained from wheel rotational speed of said vehicle and reciprocal of a turning radius obtained from lateral acceleration of said vehicle; and
    determining a value corresponding to said shift rate calculated by a difference between the reciprocal of a turning radius obtained from said wheel rotational speed and the reciprocal of a turning radius obtained from said lateral acceleration; and
  determining loading sensitivity obtained by dividing said shift rate by lateral acceleration at every vehicle speed region.

9. A device for detecting decompression of tires based on rotational speed of wheels mounted on a vehicle, comprising:
  a rotational speed-detecting means for determining rotational speeds of said wheels;
  a memory means for memorizing the rotational speeds of said wheels;
  a sensitivity-calculating means for determining loading sensitivity of dynamic load radii of said tires caused by movement of a load during turning of said vehicle;
  a sensitivity-comparing means for comparing the loading sensitivity of dynamic load radii of said tires caused by movement of a load during said turning with predetermined loading sensitivity of dynamic load radii of said tires during normal air pressure; and
  a judgment means for judging reduction of air pressure of tires based on a result of said comparison.

10. The device for detecting decompression of tires of claim 9 further comprising a sensitivity-calculating means for determining loading sensitivity of dynamic load radii of said tires caused by movement of a load during turning of said vehicle by calculating a relation equation between lateral acceleration of said vehicle and a relative comparison between sums of said wheel rotational speeds on a pair of diagonals of said vehicle.

11. A device for detecting decompression of tires of claim 9 further comprising:
  a sensitivity-comparing means for comparing the loading sensitivity of dynamic load radii of said tires caused by movement of a load during turning of said vehicle with predetermined loading sensitivities of dynamic load radii of various tires; and
  a judgment means for judging decompression of tires based on the result of said comparison, including:
    a sensitivity-deducing means for deducing reduced pressure sensitivity of dynamic load radii of said tires based on the result of said comparison; and
    a judgment means for judging decompression of tires based on the result of said deduction.

12. The device for detecting decompression of tires of claim 11 further comprising a sensitivity-calculating means for determining loading sensitivity of dynamic load radii of said tires caused by movement of a load during turning of said vehicle by calculating a relation equation between lateral acceleration of said vehicle and a relative comparison between sums of said wheel rotational speeds on a pair of diagonals of said vehicle.

13. The device for detecting decompression of tires of claim 11 or 12, further comprising a threshold-changing means for changing a threshold for judging decompression of said tires by said reduced pressure sensitivity.

14. The device for detecting decompression of tires of claim 9 and further comprising means for determining the loading sensitivity of the dynamic load radii of tires, including a loading sensitivity-calculating device for determining the loading sensitivity of dynamic load radii by loading fluctuation of tires, comprising:
  a lateral acceleration-calculation means for determining lateral acceleration of a vehicle during turning of said vehicle;
  a shift rate-calculating means for determining a shift rate of a judgment value calculated by relative comparison of sums of said wheel rotational speeds on a pair of diagonals of said vehicle; and
  a loading sensitivity-calculating means for determining loading sensitivity obtained by dividing said shift rate by said lateral acceleration at every vehicle speed region.

15. The device for detecting decompression of tires of claim 9 and further comprising means for determining the loading sensitivity of the dynamic load radii of tires, including a loading sensitivity-calculating device for determining the loading sensitivity of dynamic load radii by loading fluctuation of tires, comprising:
  a lateral acceleration-calculation means for determining lateral acceleration of a vehicle during turning of said vehicle;
  a shift rate-calculating means for determining a shift rate of a judgment value calculated by relative comparison of sums of said wheel rotational speeds on a pair of diagonals of said vehicle, including:
    means for determining a yaw rate of said vehicle;
    means for determining reciprocal of a turning radius obtained from wheel rotational speed of said vehicle and reciprocal of a turning radius obtained from said yaw rate; and
    means for determining a value corresponding to said shift rate calculated by a difference between the reciprocal of a turning radius obtained from said wheel rotational speed and the reciprocal of a turning radius obtained from said yaw rate; and a loading sensitivity-calculating means for determining loading sensitivity obtained by dividing said shift rate by said lateral acceleration at every vehicle speed region.

16. The device for detecting decompression of tires of claim 9 and further comprising means for determining the loading sensitivity of the dynamic load radii of tires, including a loading sensitivity-calculating device for determining the loading sensitivity of dynamic load radii by loading fluctuation of tires, comprising:

a lateral acceleration-calculation means for determining lateral acceleration of a vehicle during turning of said vehicle;

a shift rate-calculating means for determining a shift rate of a judgment value calculated by relative comparison of sums of said wheel rotational speeds on a pair of diagonals of said vehicle, including:

means for determining the reciprocal of a turning radius obtained from wheel rotational speed of said vehicle and reciprocal of a turning radius obtained from said lateral acceleration; and means for determining a value corresponding to said shift rate calculated by a difference between the reciprocal of a turning radius obtained from said wheel rotational speed and the reciprocal of a turning radius obtained from said lateral acceleration; and a loading sensitivity-calculating means for determining loading sensitivity obtained by dividing said shift rate by said lateral acceleration at every vehicle speed region.

17. A program, carried on a machine-readable media, for judging decompression of tires based on rotational speed of wheels mounted on a vehicle, the program, when executed, performing a method comprising the steps of:

memorizing rotational speeds of said wheels;

determining loading sensitivity of dynamic load radii of said tires caused by movement of a load during turning of said vehicle;

comparing the loading sensitivity of dynamic load radii of said tires caused by movement of a load during said turning with loading sensitivity of dynamic load radii of said tires during normal air pressure;

judging decompression of said tires based on a result of said comparison; and providing an indication of decompression of said tires.

18. The program for judging decompression of tires of claim 17 wherein the method performed further comprises the step of determining loading sensitivity of dynamic load radii of said tires caused by movement of a load during turning of said vehicle by calculating a relation equation between lateral acceleration of said vehicle and a relative comparison between sums of said wheel rotational speeds on a pair of diagonals of said vehicle.

19. The program for judging decompression of tires of claim 17 wherein the method performed further comprises the step of:

comparing the loading sensitivity of dynamic load radii of said tires caused by movement of a load during turning of said vehicle with predetermined loading sensitivities of dynamic load radii of various tires; and judging decompression of tires based on the result of said comparison, including:

deducing reduced pressure sensitivity of dynamic load radii of said tires based on a result of said comparison; and judging decompression of tires based on the result of said deduction.

20. The program for judging decompression of tires of claim 19 wherein the method performed further comprises the step of determining loading sensitivity of dynamic load radii of said tires caused by movement of a load during turning of said vehicle by calculating a relation equation between lateral acceleration of said vehicle and a relative comparison between sums of said wheel rotational speeds on a pair of diagonals of said vehicle.

21. The program for judging decompression of tires of claim 19 or 20, wherein the method performed further comprises the step of changing a threshold for judging decompression of said tires by said reduced pressure sensitivity.

22. The program for judging decompression of tires of claim 17 wherein the method performed further comprises determining the loading sensitivity of the dynamic load radii of tires, which further includes calculating loading sensitivity of tires, which further includes the steps of:

determining lateral acceleration of a vehicle during turning of said vehicle;

determining a shift rate of a judgment value calculated by relative comparison of sums of said wheel rotational speeds on a pair of diagonals of said vehicle; and determining loading sensitivity obtained by dividing said shift rate by said lateral acceleration at every vehicle speed region.

23. The program for judging decompression of tires of claim 17 wherein the method performed further comprises determining the loading sensitivity of the dynamic load radii of tires, which further includes calculating loading sensitivity of tires, which further includes the steps of:

determining lateral acceleration of a vehicle during turning of said vehicle;

determining a shift rate of a judgment value calculated by relative comparison of sums of said wheel rotational speeds on a pair of diagonals of said vehicle, including the steps of:

determining a yaw rate of said vehicle;

determining reciprocal of a turning radius obtained from wheel rotational speed of said vehicle and reciprocal of a turning radius obtained from said yaw rate; and determining a value corresponding to said shift rate calculated by a difference between the reciprocal of a turning radius obtained from said wheel rotational speed and the reciprocal of a turning radius obtained from said yaw rate; and determining loading sensitivity obtained by dividing said shift rate by said lateral acceleration at every vehicle speed region.

24. The program for judging decompression of tires of claim 17 wherein the method performed further comprises determining the loading sensitivity of the dynamic load radii of tires, which further includes calculating loading sensitivity of tires, which further includes the steps of:

determining lateral acceleration of a vehicle during turning of said vehicle;

determining a shift rate of a judgment value calculated by relative comparison of sums of said wheel rotational speeds on a pair of diagonals of said vehicle, including the steps of:

determining the reciprocal of a turning radius obtained from wheel rotational speed of said vehicle and reciprocal of a turning radius obtained from said lateral acceleration; and determining a value corresponding to said shift rate calculated by a difference between the reciprocal of a turning radius obtained from said wheel rotational speed and the reciprocal of a turning radius obtained from said lateral acceleration; and determining loading sensitivity obtained by dividing said shift rate by said lateral acceleration at every vehicle speed region.

* * * * *